(12) United States Patent
Harper et al.

(10) Patent No.: US 8,104,296 B2
(45) Date of Patent: Jan. 31, 2012

(54) STORAGE TANK FOR A CRYOGENIC FLUID WITH A PARTITIONED CRYOGEN SPACE

(75) Inventors: Gregory Charles Harper, Vancouver (CA); Adrian Post, Surrey (CA)

(73) Assignee: Westport Power Inc., Vancouver, BC (CA)

( * ) Notice: Subject to any disclaimer, the term of this patent is extended or adjusted under 35 U.S.C. 154(b) by 1280 days.

(21) Appl. No.: 11/681,755

(22) Filed: Mar. 2, 2007

(65) Prior Publication Data
US 2008/0209915 A1 Sep. 4, 2008

(51) Int. Cl.
*F17C 3/08* (2006.01)
(52) U.S. Cl. ......................................................... 62/45.1
(58) Field of Classification Search .................. 62/45.1, 62/48.2–48.3; 220/501, 503, 560.01, 560.04, 220/560.09, 563, 564
See application file for complete search history.

(56) References Cited

U.S. PATENT DOCUMENTS

| | | | |
|---|---|---|---|
| 1,518,906 A | 12/1924 | Edwards | |
| 2,293,263 A | 8/1942 | Kornemann et al. | |
| 2,780,922 A | 2/1957 | Johannesen | |
| 2,971,667 A | 2/1961 | Benson et al. | |
| 3,049,226 A | 8/1962 | Schurr | |
| 3,424,186 A | 1/1969 | Sparks | |
| 3,712,502 A | 1/1973 | Basier et al. | |
| 3,804,291 A | 4/1974 | Fricker | |
| 4,142,562 A | 3/1979 | Murray | |
| 4,823,829 A | 4/1989 | Woods | |
| 4,956,975 A * | 9/1990 | Gustafson | 62/50.7 |
| 5,312,012 A * | 5/1994 | Zink | 220/563 |
| 5,404,918 A * | 4/1995 | Gustafson | 141/1 |
| 5,411,374 A | 5/1995 | Gram | |
| 5,477,690 A | 12/1995 | Gram | |
| 5,551,488 A | 9/1996 | Gram | |
| 5,685,159 A * | 11/1997 | Kooy et al. | 62/50.1 |
| 5,758,795 A * | 6/1998 | Johnson | 220/564 |
| 6,128,908 A * | 10/2000 | Gustafson | 62/45.1 |
| 6,698,211 B2 | 3/2004 | Gustafson | |
| 6,845,782 B2 * | 1/2005 | Osterkil et al. | 137/1 |
| 2005/0028536 A1 * | 2/2005 | Noble et al. | 62/45.1 |

FOREIGN PATENT DOCUMENTS

CA 2505606 11/2005

* cited by examiner

*Primary Examiner* — Frantz Jules
*Assistant Examiner* — Lukas Baldridge
(74) *Attorney, Agent, or Firm* — McAndrews, Held & Malloy, Ltd.

(57) ABSTRACT

A cryogenic storage tank comprises a partition that divides a cryogen space into a main storage space and an auxiliary space. A valve disposed inside the cryogen space is associated with a first fluid passage through the partition. The valve comprises a valve member that is actuatable by fluid forces within the cryogen space. A second fluid passage through the partition comprises a restricted flow area that is dimensioned to have a cross-sectional flow area that is smaller than that of a fill conduit such that there is a detectable increase in back-pressure when the main storage space is filled with liquefied gas.

26 Claims, 10 Drawing Sheets

STORAGE TANK FOR A CRYOGENIC FLUID WITH A PARTITIONED CRYOGEN SPACE

FIELD OF THE INVENTION

Figure 1:
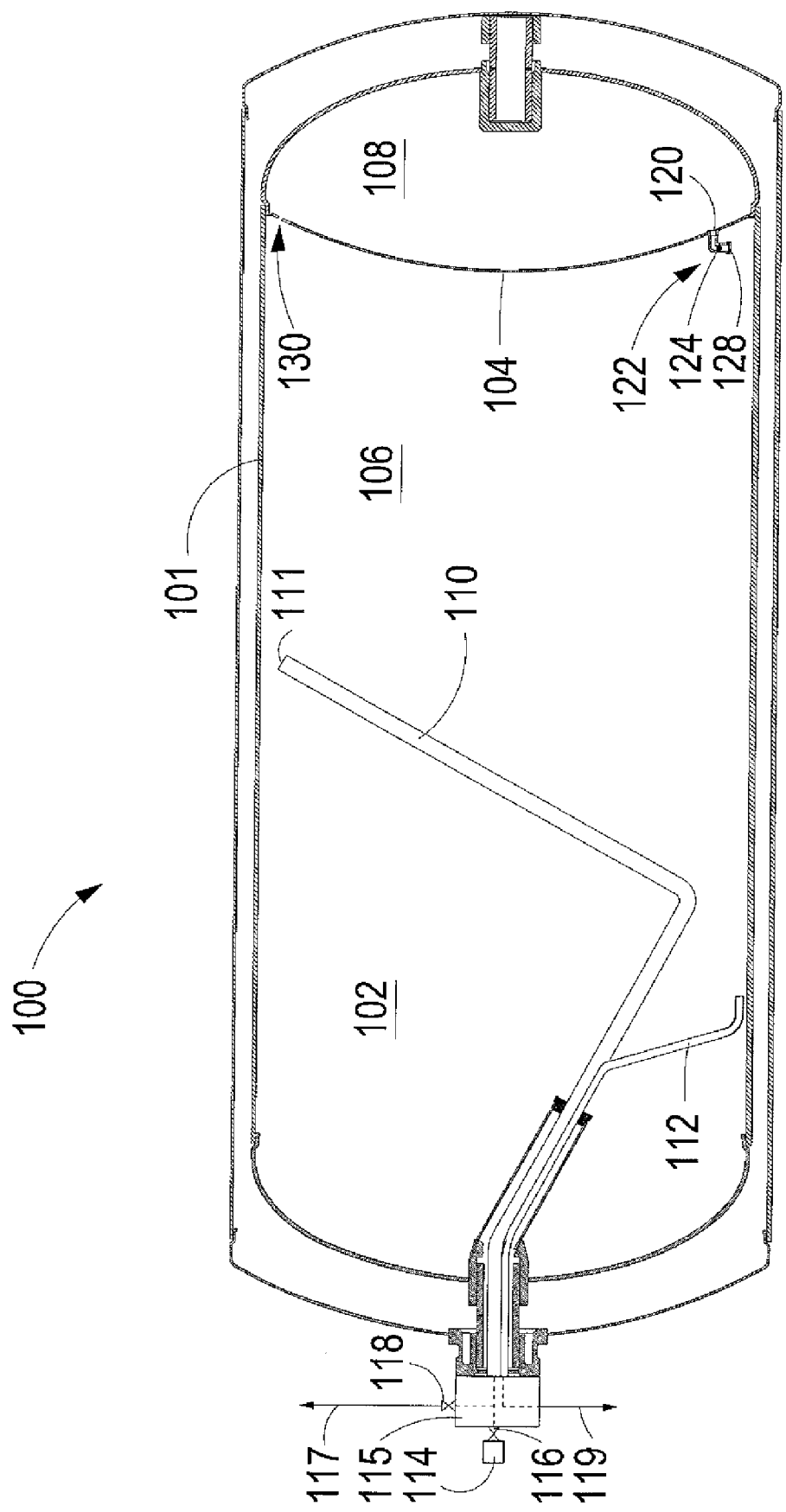

The present invention relates to a storage tank for a cryogenic fluid with a partitioned cryogen space. More particularly, a partition divides the cryogen space into two storage spaces with the apparatus and method comprising at least two fluid passages through the partition and at least one valve that regulates the flow of cryogenic fluid between the two storage spaces.

BACKGROUND OF THE INVENTION

Cryogenic fluids comprise liquefied gases that generally have boiling points below −100° C. (about −150° F.) at atmospheric pressure. Examples of cryogenic fluids include liquefied natural gas (LNG), and other gases, such as nitrogen, oxygen, carbon dioxide, methane and hydrogen, that are storable in liquefied form at cryogenic temperatures.

To prevent cryogenic fluids from boiling off and to increase the time that they can be stored in liquefied form, cryogenic fluids can be stored in thermally insulated storage tanks that consist of an inner storage vessel mounted within an outer shell, with thermal insulation provided by insulating materials and a vacuum disposed in the space between the inner vessel and the outer shell. The inner vessel defines a cryogen space in which a liquefied gas can be stored at cryogenic temperatures. Such an arrangement reduces the transfer of heat from the ambient environment to the cryogenic fluid stored within the cryogen space, but some heat transfer into the cryogen space, which can also be referred to as "heat leak" is inevitable. Heat leak warms the cryogenic fluid, which lowers the density of the liquefied gas and increases the bulk temperature and pressure of the cryogenic fluid. In a fixed volume, the lowered density of the liquefied gas causes an increase in the density of the cryogenic vapor and some vapor will be condensed back into the expanding liquid. Overall, the volume of liquefied gas in the cryogen space will increase steadily as the bulk temperature and vapor pressure increase due to heat leak. If the overall pressure in the cryogen space rises above the set point of the pressure relief valve, vapor is vented from the cryogen space to atmosphere, or to a recovery system or directly to an end user. For example, with what is known in the industry as an economizer system, vented vapor can be delivered directly to an engine. However, it is still preferable to reduce venting cryogenic fluid from the cryogen space, and so it is desirable to design storage tanks to reduce heat leak so that cryogenic fluids can be stored for longer periods of time without venting. Each pipe that penetrates through the insulating space and into the cryogen space provides a thermal conduction path that can contribute to heat leak. Reducing the number of pipes that extend between the inner storage vessel and the outer shell can reduce heat leak. Heat leak can also be reduced by selecting materials with lower thermal conductivity for the structural supports for the inner storage vessel.

Another method of increasing holding times and reducing the possibility of venting vapor from the cryogen space is to reserve a portion of the cryogen space for vapor when the storage tank is filled. This vapor space is known as the ullage space, and the ullage space provides a volume for cryogenic fluid to expand into so that the tank does not become liquid full before reaching the relief valve set point pressure. If a storage tank is filled completely with a liquefied gas, without reserving a vapor-filled ullage space, even a very small amount of heat leak can result in a rapid increase in storage pressure, because there is little space into which the liquefied gas can expand. Accordingly, it is common practice when filling a storage tank to reserve an ullage space that is not filled with liquefied gas. To assist with preventing an ullage space from being filled with cryogenic liquid while filling a storage tank, U.S. Pat. No. 5,404,918, entitled, "Cryogenic Liquid Storage Tank" (the '918 patent), discloses a storage tank with a partitioned cryogen space with only one passage means between the main tank and the ullage space. The cross-sectional flow area of the passage means is smaller than the cross-sectional flow area of the fill line so that the liquefied gas is restricted from flowing into the partitioned ullage space when the cryogen space is being filled. A problem with this arrangement is that although the flow area of the passage means is smaller than the cross-sectional flow area of the fill line, it can still allow a quantity of liquefied gas to flow into the ullage space during filling, especially when the passage means is located near the bottom of the partition to assist with draining liquefied gas back into the main tank. Perhaps more importantly, another problem with this arrangement is that the flow restriction caused by the passage means also acts to restrict flow of the cryogenic fluid from the ullage space back into the main tank. When a storage tank is being filled, if the storage tank is not initially empty there can be some liquefied gas already inside the ullage space. This is common for storage tanks used to carry fuel for a vehicle engine because completely emptying the storage tank will leave the vehicle out of fuel and stranded. When re-filling a partially empty storage tank, the newly introduced liquefied gas flowing into the main tank during the re-filling process can condense the vapor inside the main tank thereby lowering the pressure in the main tank. Meanwhile, the flow restriction provided by the passage means restricts the flow rate of liquefied gas that is flowing from the ullage space back into the main tank, driven under such circumstances by the pressure in the ullage space being higher than the pressure in the main tank. At the end of the filling process, the restricted flow of liquefied gas from the ullage space can result in a significant amount of liquefied gas being trapped inside the ullage space, resulting in a reduced volume reserved for vapor. This outcome is disadvantageous because a reduced volume of vapor at the end of the re-filling process means that there is less volume for cryogenic fluid to expand into, which in turn means shorter hold times before vapor is vented from the cryogen space. Also, during use after re-filling, if the liquefied gas is being delivered from the storage tank at a high rate, another disadvantage of storage tanks with one restricted fluid passage through the partition is that the flow restriction provided by the single fluid passage can slow down the rate at which the liquefied gas can be delivered. Some, of the problems associated with the design taught by the '918 patent are overcome by the design taught by U.S. Pat. No. 6,128,908 entitled "Cryogenic Liquid Storage Tank with Integral Ullage Tank" (the '908 patent). The '908 patent teaches an arrangement similar to that of the '918 patent except that the passage between the ullage tank and the main tank connects the lower part of the ullage tank with the upper part of the main tank. This prevents liquefied gas from flowing into the ullage tank during the first part of the filling process, but the small diameter of the provided passage still restricts the rate at which liquefied gas can flow back into the main tank. However, this design introduces new problems because it relies upon a pressure differential between the ullage tank and the main tank to remove liquefied gas from the ullage tank and this can also result in liquefied gas being trapped inside the ullage tank. The effectiveness of the storage tank taught by the '908 patent can be compromised if heat transfer through the partition wall between the main tank and the ullage tank cools the vapor in the ullage tank to such a degree that it condenses vapor in the ullage space thereby reducing vapor pressure therein. If the pressure differential is not high enough to effectively remove the liquefied gas from the ullage space through the vertical passage, when the tank is re-filled this can result in the reserved vapor space being smaller than desired. In addition, another disadvantage of the design taught by the '908 patent is that, because of the small diameter of the vertical passage between the ullage space and main tank, it appears that blockage of the passage is possible, leading the developers of this design to introduce into preferred embodiments a pressure relief device operative to prevent over-pressurization of the ullage space, adding to the cost of manufacture, as well as adding to the possible failure modes should the pressure relief valve fail.

U.S. Pat. No. 5,685,159 entitled, "Method and System for Storing Cold Liquid" (the '159 patent), discloses an arrangement that comprises a main tank and an auxiliary tank, which can act as an ullage space for the main tank. In a disclosed preferred embodiment, when the auxiliary tank is external to the main storage tank, the system can comprise a solenoid valve that controls flow between the main storage tank and the auxiliary tank. An electronic controller can be programmed to automatically actuate the solenoid to close the valve when the tank is being filled and to otherwise keep the valve open to allow the auxiliary tank to communicate with the main storage tank and to act as the ullage space. A disadvantage of this arrangement is that the conduit between the main tank and the auxiliary tank introduces another heat transfer path into the cryogen space. However for maintenance purposes the solenoid valve should be located outside of the storage vessel where it can be accessed for servicing and where the solenoid will not itself introduce heat into the cryogen space.

The '159 patent also discloses other preferred embodiments in which the auxiliary tank is located inside the main storage tank. In these embodiments, instead of a valve, capillary tubes are employed to restrict flow of cryogenic fluid into the auxiliary tank during filling and to allow communication between the auxiliary tank and the main storage tank so that the internal auxiliary tank can act as the ullage space and so that cryogenic fluid (liquid and/or vapor) can drain back into the main storage tank. One problem with this arrangement is that at least one capillary tube is preferably associated with the low point of the ullage space so that liquefied gas that enters or condenses inside the ullage space can be drained there from through the capillary tube that is associated with the low point of the ullage space. Since the capillary tubes remain open, they can allow flow of the cryogenic fluid into the auxiliary tank during re-filling, which can result in a reduced volume of vapor space.

SUMMARY OF THE INVENTION

A cryogenic storage tank comprises a cryogen space defined by a thermally insulated vessel for storing a cryogenic fluid and a partition dividing the cryogen space into a main storage space and an auxiliary space. In a preferred embodiment, a conduit connects the main storage space with a coupling outside the storage tank, a valve is disposed inside the cryogen space and associated with a first fluid passage through the partition, the valve comprising a valve member that is actuatable by fluid forces within the cryogen space to move between an open position and a seated position, and a second fluid passage is provided through the partition, wherein the second fluid passage comprises a restricted flow area that is dimensioned to have a cross-sectional flow area that is smaller than that of the conduit such that there is a detectable increase in back-pressure in the conduit when the cryogenic fluid is being introduced into the main storage space, and the main storage space is filled with liquefied gas.

In preferred embodiments the valve member is movable from the open position to the seated position when fluid pressure within the main storage space is higher than fluid pressure within the auxiliary space by a predetermined amount. For example, to move the valve member to the seated position, the predetermined amount by which the fluid pressure within the main storage space must exceed the fluid pressure within the auxiliary space is fixed by a bias that the valve member has to the open position. For example, the valve member can be oriented within the cryogen space so that gravitational forces add to the fluid forces that act on the valve member, wherein the gravitational forces bias the valve member towards the open position. In such embodiments, the valve member can be moveable along a vertical or sloped axis between the open and seated positions.

In preferred embodiments, the fluid forces acting on the valve member comprise static liquefied gas pressure and vapor pressure, and when the valve is open, dynamic fluid momentum forces caused by cryogenic fluid that flows through the valve. Static liquefied gas pressure is determined by the depth of the liquefied gas at the point where the fluid force is measured, this force being greatest at the lowest point within the cryogen space, and zero above the level of the liquefied gas.

In a preferred embodiment the valve member is spherical in shape. Persons familiar with the technology involved here will understand that other shapes are possible. An advantage of a spherical shape is that it is relatively easy to manufacture and it is not necessary to guide the movement and orientation of the valve member for it to seat properly in the seated position. This preferred arrangement simplifies the valve mechanism, improving the robustness of the valve, which is desirable since the valve is installed in a location that is difficult to access for repair. The simple design also reduces manufacturing and assembly costs. The valve member can be made from materials selected from the group consisting of metallic materials and ceramic materials. These materials are suitable for use in a cryogenic environment. While metallic materials such as stainless steel have been tested in a prototype cryogenic storage tank, persons familiar with the technology involved here will understand that other suitable materials known to be durable in a cryogenic environment could be substituted, such as other metallic materials like carbon steel, or non-metallic materials such as polytetrafluoroethylene or glass.

In preferred embodiments the first fluid passage and the valve are sized to allow the cryogenic fluid to flow from the auxiliary space to the main storage space at a rate that keeps the liquefied gas at a level within the auxiliary space that is substantially the same as the level of the liquefied gas within the main storage space when the cryogenic fluid is being dispensed from the cryogen space. This allows the level of the liquefied gas to be maintained at about the same level on both sides of the partition when liquefied gas is being dispensed from the storage tank. The disclosed storage tank provides an advantage over prior art designs that employed a single restricted fluid passage through the partition, because there could be conditions under which the delivery of liquefied gas from the main storage space of a prior art storage tank is constrained by the rate at which liquefied gas can be drained from the auxiliary space. In one embodiment, the storage tank comprises an outlet conduit extending from the main storage space to outside the thermally insulated vessel, wherein the first fluid passage and the valve, when open, each respectively have a cross-sectional flow area that at its smallest section is at least as large as the cross-sectional flow area of the outlet conduit at its smallest section. Sizing the fluid passage and valve in this way ensures that delivery of the cryogenic fluid from the cryogen space is not constrained by the rate at which fluid can be transferred from the auxiliary space to the main storage space.

In some embodiments the valve member is movable to the open position when vapor pressure within the auxiliary space is equal to vapor pressure within the main storage space. In this case, this means that the valve member is biased to the open position. For example, a valve member can be urged to the closed position at a time when the main storage space is being filled with cryogenic fluid. After the re-filling process is completed, because of the opening through the second fluid passage and heat transfer through the partition, eventually vapor pressures become substantially equalized, and with such an embodiment, this allows the valve to open so that the level of liquefied gas can also equalize.

The partition can be oriented to extend between an upper region and a lower region of the cryogen space, thereby defining one side of the cryogen space as the auxiliary space. A partition that is substantially perpendicular to the longitudinal axis, defining the auxiliary space as one end of the cryogen space is a preferred embodiment because it is relatively easy to build a storage tank with this configuration. However, because this results in liquefied gas occupying the cryogen space on both sides of the partition after equilibrium conditions are reached after venting and re-filling, it can be advantageous for the second fluid passage to comprise a conduit with a first opening into the main storage space near the upper region of the cryogen space, a second opening into the auxiliary space near the lower region of the cryogen space. An advantage of this arrangement is that liquefied gas can be drained through both first and second fluid passages when there is a sufficient pressure differential during venting and re-filling because the second fluid passage opens into the lower region of the auxiliary space. This arrangement also helps to maintain a pressure differential during venting and filling because as long as the open end in the auxiliary space is submerged in liquefied gas, vapor can not escape through the second fluid passage.

Nevertheless, simpler embodiments of the second fluid passage are also acceptable and can still function according to the disclosed method. For example, it is simpler and less expensive for the second fluid passage to be a hole through the partition, whereby the second fluid passage has a length that is defined only by the thickness of the partition. Instead of a simple hole, the second fluid passage can comprise a plate with an orifice that defines the restricted flow area in the second fluid passage. The orifice plate adds to the length of the second fluid passage and can facilitate more precise machining of the orifice size.

In yet another embodiment, the second fluid passage can further comprise a valve disposed therein, this being the second valve disposed within the cryogen space with the valve associated with the first fluid passage being the first valve. Like the first valve, the second valve can comprise an associated valve member that is actuatable by fluid forces within the cryogen space to move between an open position and a seated position. In a preferred arrangement for this embodiment, the valve member associated with the second valve is movable by differential fluid pressure, to move the valve member to the open position to allow cryogenic fluid to flow from the main storage space to the auxiliary space when fluid pressure inside the main storage space is higher than fluid pressure inside the auxiliary space by a predetermined amount. Closing forces acting on the valve member of the second valve can urge the valve member to the seated position when fluid pressure within the main storage space does not exceed fluid pressure within the auxiliary space by a predetermined amount. In such embodiments the second valve is biased in the closed position so that fluid pressure in the main storage space must exceed fluid pressure in the auxiliary space by a predetermined amount to open the second valve. This is advantageous during venting and re-filling because it prevents vapor from escaping the auxiliary space through the second fluid passage, while also preventing newly introduced cryogenic fluid from flowing from the main storage space to the auxiliary space, in which an ullage volume is being preserved. Later, after re-filling is completed, the second valve can open to allow vapor to expand into the auxiliary space if liquefied gas expands and fluid pressure rises within the main storage space. In a preferred embodiment of the second valve, it is oriented within the cryogen space so that the valve member associated with the second valve is gravity biased in the seated position. The term "seated" position is used here and elsewhere in this specification because the first and second valves remain operative even if a perfectly fluid-tight seal is not formed when the valve member is in the seated position. That is, whether seated or perfectly sealed, when urged against the valve seat, the valve member will restrict flow through the associated fluid passage to a degree that allows the apparatus to operate in accordance with the disclosed method. Like the first valve, in preferred embodiments of the second valve, the valve member associated with the second valve is spherical, and the valve member can be made from materials selected from the group consisting of metallic materials and ceramic materials.

In one embodiment the second valve permits fluid flow through the second fluid passage only in a direction from the main storage space to the auxiliary space. This helps to maintain a pressure differential during venting and re-filling but prevents liquefied gas from being drained from the auxiliary space through the second fluid passage, as is possible when the second fluid passage comprises a conduit extending from an upper region of the main storage space to a lower region of the auxiliary space.

In preferred embodiments the auxiliary space is smaller than the main storage space. For example, for a storage tank with a cryogen space that is about 75 U.S. gallons (about 0.28 cubic meters), the auxiliary space is preferably less than 15% by volume of the cryogen space, and in some embodiments can be less than 10% by volume of the cryogen space.

In some embodiments, the storage tank comprises an outlet conduit extending from the main storage space to outside the thermally insulated vessel. In other embodiments, the storage tank comprises a pump with an inlet disposed within the main storage space with an outlet conduit extending from the pump to outside the thermally insulated vessel. A storage tank with a pump is more suitable for storage tanks that are employed to deliver a cryogenic fluid at a higher pressure, whereas an outlet conduit without a pump can be employed when the cryogenic fluid is delivered at a lower pressure, with the cryogenic fluid pushed from the cryogen space by the vapor pressure therein. A storage tank with an outlet conduit can also be combined with a system with an external pump.

A vent conduit is associated with the storage tank for venting vapor from the cryogen space. In preferred embodiments a portion of the fill conduit can also serve as part of the vent conduit. In one such arrangement the vent conduit branches off from the fill conduit outside the thermally insulated vessel and valves associated with the fill conduit and the vent conduit are operative so that vapor can be vented through the vent conduit or through the fill conduit and fill station hose to pre-cool the fill station hose prior to re-filling.

A method is provided of holding a cryogenic fluid comprising liquefied gas and vapor in the disclosed storage tank. The method comprises establishing a vapor-filled ullage space when the main storage space is being vented and re-filled with cryogenic fluid, by draining liquefied gas from the auxiliary space to the main storage space through a first fluid passage provided through the partition. The first fluid passage is sized to allow the liquefied gas to flow there through under the influence of a vapor pressure differential permitted by the partition. The liquefied gas drains at a rate that allows the auxiliary space to be drained of liquefied gas to a level that establishes the vapor-filled ullage space with a volume that is at least as large as a predetermined ullage volume in less than the time to vent and re-fill the main storage space with cryogenic fluid. The method further comprises preserving the vapor-filled ullage space by restricting flow of liquefied gas through the first fluid passage from the main storage space into the auxiliary space when the cryogen space is being re-filled with cryogenic fluid and restricting cryogenic fluid flow through a second fluid passage. The method further comprises stopping the flow of cryogenic fluid into the cryogen space through the fill conduit when detecting an increase in back-pressure that occurs when the main storage space is filled with liquefied gas.

The method can further comprise transferring the cryogenic fluid between a lower region of the auxiliary space and an upper region of the main storage space, when the cryogenic fluid is flowing through the second fluid passage.

In a preferred embodiment, the step of restricting flow through the first fluid passage comprises regulating flow there through with a valve that comprises a valve member that is actuatable between an open and a seated position by fluid forces within the cryogen space, whereby fluid flow is restricted by the valve when the valve member is in the seated position. In one embodiment, the valve member is urged towards the seated position when fluid pressure acting on the valve member from fluid within the main storage space is higher than fluid pressure acting on the valve member from fluid within the auxiliary space by a predetermined margin, and the valve member is otherwise urged to the open position.

When re-filling the main storage space with cryogenic fluid, the method can further comprise introducing the cryogenic fluid at a flow rate that causes cryogenic fluid level within the main storage to increase at a faster rate than cryogenic fluid level can rise within the auxiliary space, whereby static fluid pressure and fluid momentum pressure acting on the valve member urge it towards the seated position.

In addition to detecting an increase in back-pressure, the step of detecting when the storage tank is full can further comprise processing a signal from a level sensor to determine the level of liquefied gas within the main storage space.

As already described in describing the preferred embodiments of the apparatus, the method can comprise venting vapor from the main storage space through the fill conduit prior to re-filling the storage tank with cryogenic fluid. This reduces the number of conduits that extend between the outside environment and the cryogen space, helping to reduce heat leak into the cryogen space. This arrangement also allows the method to further comprise venting vapor through the fill station hose to pre-cool it prior to delivering cryogenic fluid to the storage tank. Vapor vented through the fill hose can be directed to the fill station where it can be condensed and re-liquefied. In other circumstances the method can comprise venting vapor from the main storage space through a vent pipe prior to re-filling the storage tank with cryogenic fluid, for example if the fill station is not equipped or unwilling to receive vented vapor from the storage tank.

When re-filling the main storage space, the method can further comprise not introducing cryogenic fluid into the cryogen space until vapor pressure within the main storage space is below a predetermined value.

In embodiments of the apparatus that comprise a second valve associated with the second fluid passage the method can further comprise regulating fluid flow through the second fluid passage by using fluid forces within the cryogen space to actuate a valve member, whereby the second valve opens to allow cryogenic fluid to flow from the main storage space to the auxiliary space when vapor pressure in the main storage space is higher than vapor pressure within the auxiliary space by a predetermined amount. If the second valve is a one-way valve, and the method can further comprise allowing fluid to flow through the second valve only from the main storage space to the auxiliary storage space.

BRIEF DESCRIPTION OF THE DRAWING(S)

Figure 1A:
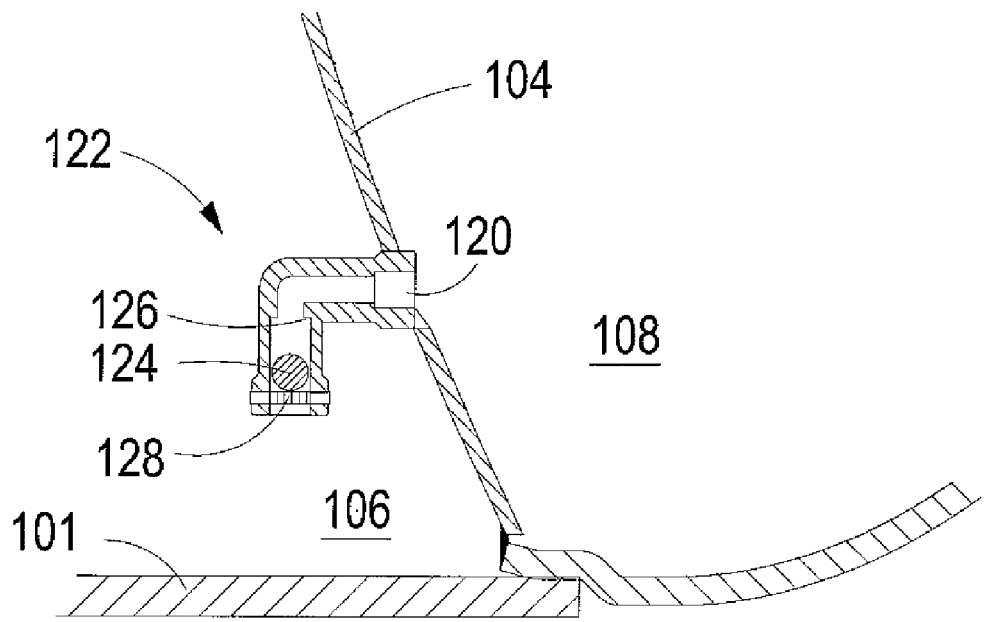

FIG. 1 is a schematic illustration of a preferred embodiment of a storage tank with a partitioned cryogen space. FIGS. 1A through 1G are enlarged views of the fluid passages through the partition with each of these enlarged views showing a different embodiment of the same general design concept. The partition divides the cryogen space into a main storage space and an auxiliary space. Each of the illustrated embodiments comprises a valve associated with a first fluid passage located near the bottom of the partition that allows flow of cryogenic fluid between the auxiliary space and the main storage space and a second fluid passage with one end that opens into the main storage space near the top of the cryogen space. In the embodiments shown in FIGS. 1, 1C and 1D the second fluid passage remains open, with the size of the opening restricting flow there through. FIGS. 1E through 1G show embodiments of the second fluid passage that further comprise a valve that is operable to allow cryogenic fluid to flow from the main storage space to the auxiliary space and that can restrict flow in the opposite direction.

Figure 2A:
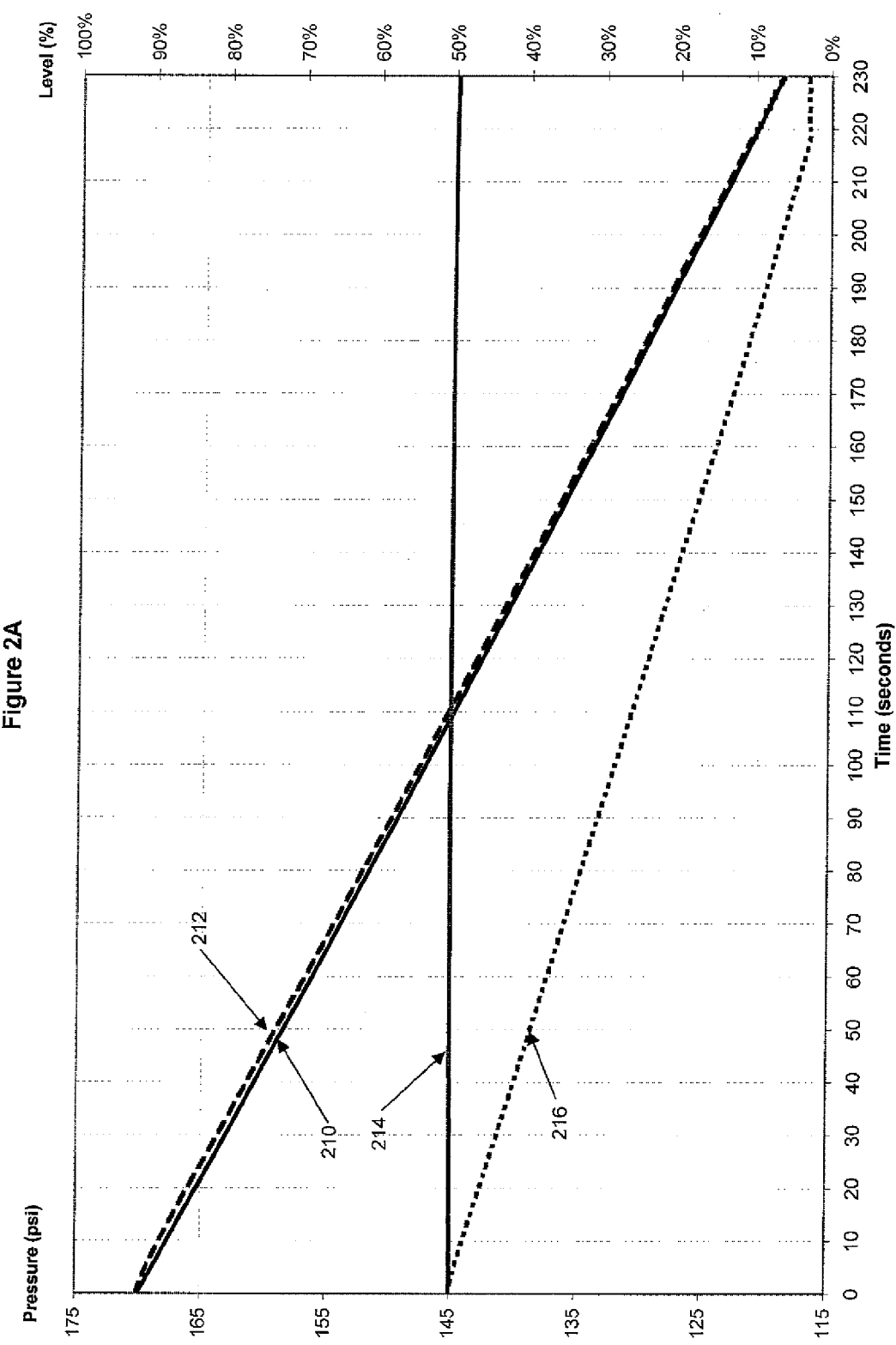
Figure 2B:
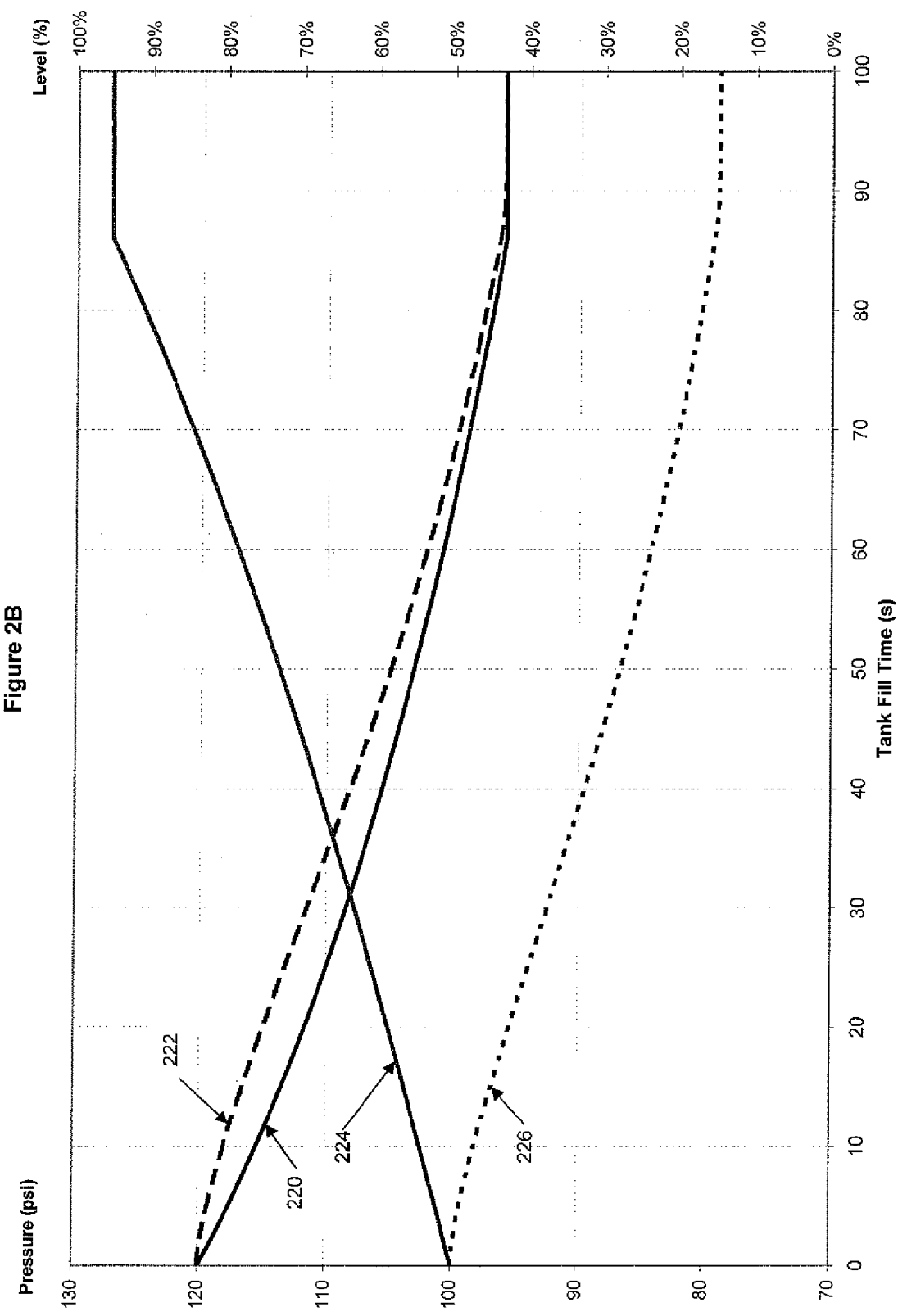

FIG. 2A is a plot of cryogenic fluid pressure overlaid with the level of liquefied gas within the cryogen space on each side of the partition, when the cryogen space is being vented to ready the storage tank for filling. FIG. 2B is a plot of the same parameters plotted against time for a different scenario when the main storage space is being re-filled. FIGS. 2A and 2B demonstrate by way of example how the disclosed embodiments are operative to drain liquefied gas from the auxiliary space and preserve a desired volume of vapor space at the end of the re-filling process, even if the level of liquefied gas in the auxiliary space is initially high.

Figure 3:
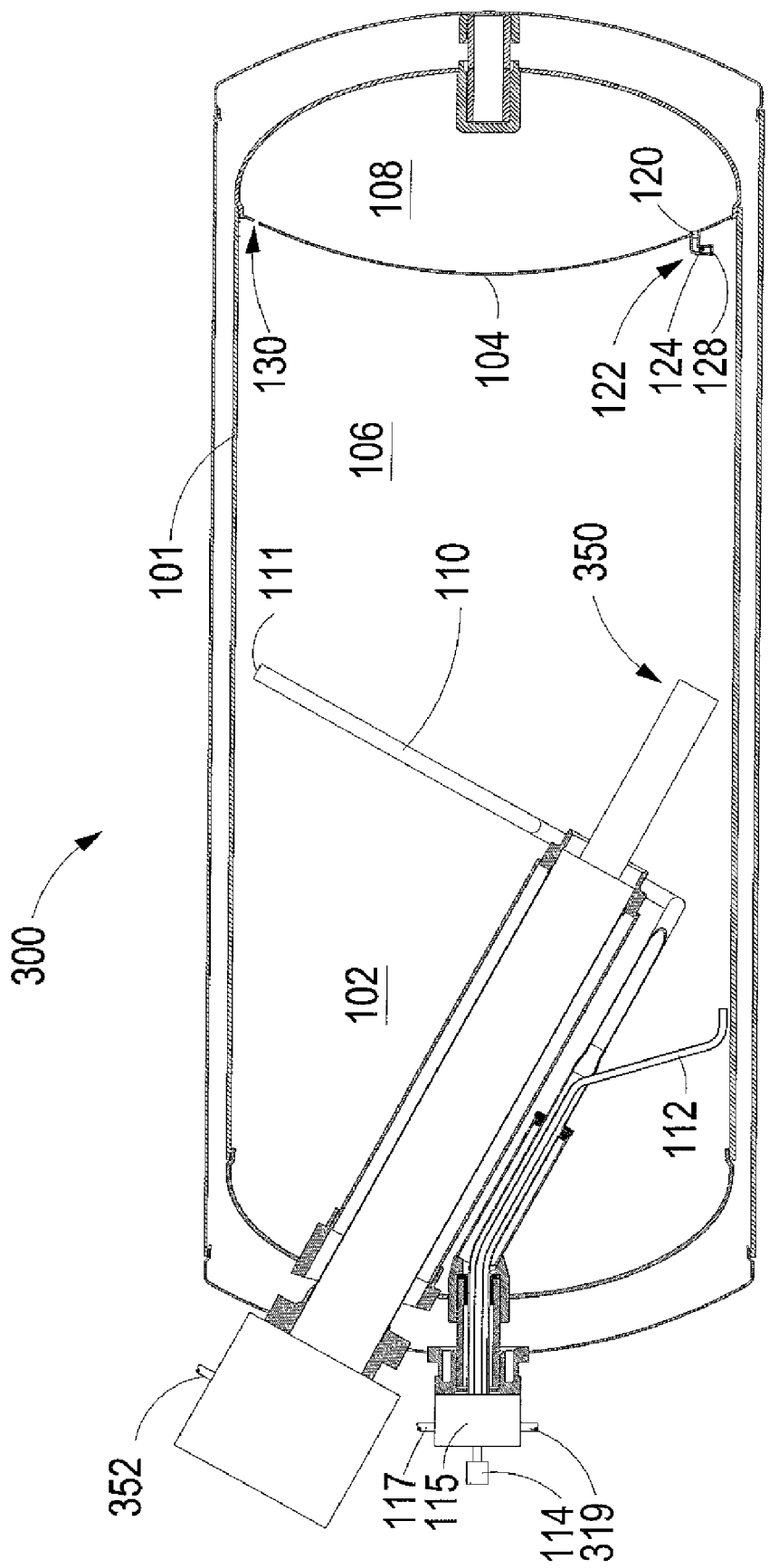

FIG. 3 is a schematic illustration of another preferred embodiment of a storage tank with a partitioned cryogen space. In this embodiment a pump is disposed within the cryogen space to deliver cryogenic fluid therefrom.

Figure 4:
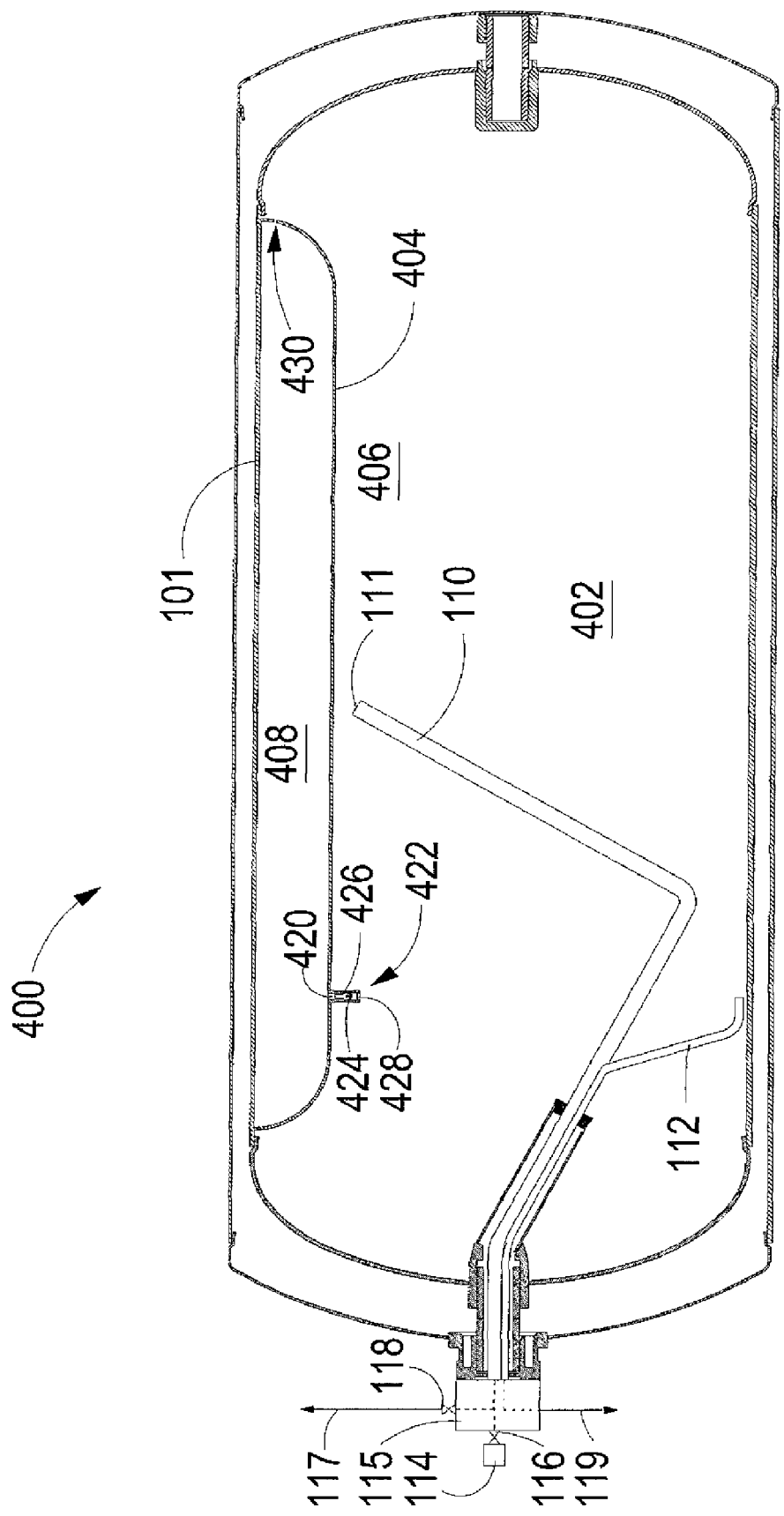

FIG. 4 is a schematic illustration of yet another embodiment in which the partition separates an upper region of the cryogen space from the main storage space that occupies the lower region of the cryogen space. This third embodiment also comprises a valve that allows liquefied gas to flow from the auxiliary space to the main storage space through a first fluid passage that is associated with the bottom of an auxiliary space and a second fluid passage comprises an opening into the auxiliary space near the top of the main storage space to allow vapor to flow from the main storage space into the auxiliary space.

In the Figures and the detailed description of the preferred embodiments, like reference numbers are used for like components in different embodiments. The embodiments are shown schematically and not to scale, with some elements exaggerated or shown symbolically to simplify and/or more clearly illustrate the embodiments shown.

DETAILED DESCRIPTION OF PREFERRED EMBODIMENT(S)

With reference to the Figures, storage tanks 100, 300 and 400 are examples of embodiments that are particularly suited for holding cryogenic fluids inside thermally insulated vessel 101, which defines respective cryogen spaces 102 and 402. FIGS. 1, 3 and 4 show that the present design can be applied to storage tanks with different configurations for the partition, and for storage tanks that are used for delivering the stored fluid at lower or relatively high pressures. For example, the embodiment of FIG. 3 shows a storage tank with an internal pump that can be used to deliver the stored fluid at a higher pressure. The different illustrated embodiments show that the present design can be useful for many different applications where such storage tanks are employed for holding and dispensing liquefied gases. For example, gases can be stored and dispensed in liquefied form to provide refrigeration for industrial processes or if the gas is used in the gaseous phase it can be stored in liquefied form to increase the storage density. A particularly suitable application for the disclosed storage tanks is for holding and dispensing a liquefied gas such as natural gas, pure methane, hydrogen, mixtures thereof, or other like combustible gases that can be delivered as fuel to an engine. The engine can be used, for example, to power a vehicle, drive other machinery, or to generate electrical power.

However, because cryogenic fluids are kept inside the storage tank at temperatures that are much lower than ambient temperatures, heat leak into the cryogen space can convert some of the stored liquefied gas into vapor, leading to increases in the vapor pressure. If the vapor pressure increases to a predetermined threshold, a pressure relief valve typically opens to vent some of the vapor and reduce the vapor pressure thereby preventing over-pressurization and damage to the storage tank. However, this results in some of the stored fluid being wasted and released into the surrounding atmosphere unless the vent is connected to a recovery system, which can add more cost and complexity to the system. Except for wasting the stored cryogenic fluid, if the stored fluid is a substance that is harmless to the environment, such as liquefied oxygen or nitrogen, there may not be concerns with venting such substances to atmosphere through a vent stack or in a well-ventilated location. For other substances such as natural gas, venting to atmosphere is not desirable, however, a recovery system may not be practical if the dispensed gas is used in liquefied form and there is no immediate use for the vented vapor, or if the end user normally uses the dispensed gas at a higher pressure than the relief pressure for the storage tank and it is not practical to boost the pressure of the vented vapor to the requisite pressure. While a pressure relief system remains a safety feature to guard against over-pressurization of the storage tank, an objective of the present design is to provide improved features that reduce the frequency or likelihood of having to vent vapor from cryogen space 102 when the storage tank is in normal operation, holding and dispensing liquefied gas.

Storage tanks 100, 300 and 400 all comprise a partitioned storage space that helps to reserve some of cryogen space 102 from being filled with liquefied gas when it is being filled so that cryogenic fluid can expand without rapidly increasing fluid pressure. As already discussed, the use of a partition in a cryogen space for this purpose is already known to persons familiar with the technology involved here, but the present design makes improvements over the previously known arrangements by automatically regulating flow between the spaces on either side of the partition depending upon the circumstances at the time, for example, at times when the cryogen space is being vented prior to re-filling the disclosed arrangement facilitates the draining of liquefied gas from auxiliary space 108, or during the re-filling process liquefied gas can continue to drain from auxiliary space 108 while a vapor space is reserved therein, or in the course of holding and dispensing liquefied gas, vapor in main storage space 106 can flow into auxiliary space 108 and the level of liquefied gas can equalize in cryogen space 102.

With reference to the embodiments illustrated in the Figures, partitions 104 and 404, in the respective embodiments, divide cryogen space 102, 402 into main storage space 106, 406 and smaller auxiliary storage space 108, 408. Cryogen space 102 is filled by introducing cryogenic fluid through conduit 110, which comprises open end 111 disposed in main storage space 106. Cryogenic fluid can be introduced into conduit 110 through coupling 114, which is located outside storage tank 100, 300 or 400. Coupling 114 can comprise an integral shut off valve that opens when coupled to a fill nozzle, and closes when a fill nozzle is not coupled to coupling 114. Manifold block 115 can be used to reduce the number of fittings and connections to simplify assembly and reduce the number of potential leak points. In FIG. 1, internal passages within manifold block 115 connect the conduits that extend into the interior of vessel 101 with three outside connections. As already implied, one internal passage leads from conduit 110 to coupling 114 for filling cryogen space with cryogenic fluid. Optional shut off valve 116 can be installed between manifold block 115 and coupling 114 and conduit 110, or to achieve the same effect with less connections, the valve assembly can be installed into a bore made in manifold block 115, whereby manifold block 115 then services as the body for shut off valve 116. With the illustrated embodiment, vapor can be vented from main storage space 106 through conduit 110. This is different from conventional systems, which commonly vent vapor to atmosphere, resulting in the gas being wasted and released into the environment. A preferred method is disclosed by co-owned Canadian Patent No. 2,506, 606, entitled, "Storage Tank for Cryogenic Liquid and Method of Re-Filling Same" (the '606 patent). The '606 patent discloses an apparatus and method for venting through the same conduit that can be used to re-fill the storage tank. Vapor that is vented through coupling 114 can be used to pre-cool the hose and/or piping that is used to deliver the liquefied gas to cryogen space 102, and this vented vapor can be re-condensed by the filling station and thereby recovered. A second internal passage within manifold block 115 can be employed to direct vented vapor from conduit 110 to conduit 117. Pressure relief valve 118 can be installed in manifold block 115 or on conduit 117 downstream from manifold block 115. If the filling station does not wish to accept vapor that is vented from cryogen space 102, the vapor can be vented through conduit 117. When the storage tank is in normal operation away from the filling station, pressure relief valve 118 automatically opens when vapor pressure inside cryogen space 102 exceeds a predetermined set point to vent vapor through conduit 117. In the embodiments shown in FIGS. 1 and 4, a third internal passage connects outlet conduit 112 with delivery conduit 119, through which cryogenic fluid is deliverable to an end user. In the embodiment shown in FIG. 3, outlet conduit 112 can still be optionally installed to connect to drain line 319, but cryogenic pump 350 is disposed within main storage space 106 to pump most of the liquefied gas to an end user through delivery conduit 352. Compared to the other embodiments, cryogenic pump 350 makes the embodiment of FIG. 3 more suitable, for example, for delivering gas to an end user at higher pressures.

Referring now to partition 104, and its associated features. Cryogenic fluid can flow between main storage space 106 and auxiliary space 108 through two fluid passages provided through partition 104, namely first fluid passage 120 and second fluid passage 130. First fluid passage 120 is provided near the bottom of cryogen space 102 to facilitate draining liquefied gas from auxiliary space 108 to main storage space 106, and under certain conditions, such as when fluid pressure is about equal in the two spaces, to also allow liquefied gas to flow in the reverse direction, from main storage space 106 to auxiliary space 108, for example allowing the level of the liquefied gas to equalize on both sides of partition 104. Two-way flow through first fluid passage 120 is facilitated when valve 122 is biased in an open position, for example when valve 122 and valve member 124 are oriented so that gravity biases valve member 124 to be spaced from valve seat 126, as shown in FIG. 1A. Allowing two-way flow through valve 122 prevents large differences in the level of liquefied gas on opposite sides of the partition, avoiding an imbalance in the static liquid pressures, which might otherwise require the structure of partition 104 to be stronger, adding to the weight and cost of the apparatus.

Valve 122 regulates flow through first fluid passage 120 with valve member 124 being automatically actuated by fluid forces within cryogen space 102. That is, valve 122 is not actuated manually, or by an actuator with a driver such as a solenoid or by a pneumatic or hydraulic piston, or by some other suitable mechanical mechanism. While additional forces can be used to bias the position of the valve member, it is fluid forces acting on valve member 124 that automatically operate it based on the circumstances at the time. These fluid forces include vapor pressure and static liquefied gas pressure when valve member 124 is seated. When valve 122 is open and cryogenic fluid is flowing through first fluid passage 120, the fluid forces acting on valve member 124 further include dynamic fluid momentum forces, acting in the direction of fluid flow. In the illustrated preferred embodiments of valve 122, it is oriented so that gravitational forces also act on the valve member to bias it in the open position. Screen 128 has large openings so that liquefied gas can flow freely into first fluid passage 120, while screen 128 prevents valve member 124 from falling out of first fluid passage 120. Instead of screen 128, other means such as protrusions from the walls of first fluid passage 120 can be employed to retain valve member 124 in first fluid passage 120.

Second fluid passage 130 is provided near the top of cryogen space 102 to allow vapor from main storage space 106 to flow into auxiliary space 108. Second fluid passage 130 preferably has its opening into main storage space 106 in the upper region thereof, to reduce flow of liquefied gas from main storage space 106 through second fluid passage 130 to auxiliary space 108 during filling. In the embodiment of FIG. 1 and FIGS. 1A through 1D, second fluid passage 130 remains open but it has a constricted flow area so that a pressure differential can still develop between main storage space 106 and auxiliary space 108. That is, when main storage space 106 is being vented prior to filling, vapor also vents from auxiliary space 108 through second fluid passage 130, but because of the constricted flow area, vapor flow can not keep up with the rate at which vapor is being vented from main storage space 106, allowing a pressure differential to develop, which helps to push liquefied gas from auxiliary space 108 to main storage space 106 through first fluid passage 120. Another benefit of the constriction in second fluid passage 130 is that when main storage space is being filled with liquefied gas, the constricted flow area helps to signal when main storage space 106 is filled, because even though open second fluid passage 130 will allow a small amount of liquefied gas to flow into auxiliary space 108 after the level of liquefied gas reaches the level of the opening of second fluid passage 130 into main storage space 106, the constricted flow area causes a detectable increase in back pressure when main storage space 106 is full. However, during normal operation when the storage tank is being used to hold and dispense cryogenic fluid, and heat leak warms some of the liquefied gas in cryogen space 102, the constricted flow area provided by second fluid passage 130 is more than adequate to allow vapor to flow between main storage space 106 and auxiliary storage space 108 to maintain an equalized vapor pressure across partition 104, such that the vapor space reserved at the end of the re-filling process forms an ullage space for cryogenic fluid to expand into, thereby reducing the rate at which vapor pressure increases, prolonging hold times, and reducing the need to vent vapor from cryogen space 102. Prior art storage tanks that employ only one fluid passage through a partition need to compromise between the need to provide a constricted fluid passage to prevent the auxiliary space from being filled when the main storage space is begin filled, and the need to provide an opening large enough to allow liquefied gas to be drained from the auxiliary space during venting and to allow adequate flow during normal operation. This drawback of such prior art designs is overcome by the present design.

FIGS. 1A through 1G are enlarged views of partition 104 and the fluid passages for regulating fluid flow there through, with each Figure showing by way of example, different arrangements that all share the same design concept.

With reference to FIG. 1A, this is an enlarged view of the arrangement for first fluid passage 120 that is shown in FIG. 1. First fluid passage 120 comprises a down-turned elbow with the vertical section having an open end facing towards the bottom of main storage space 106. Valve 122 and valve member 124 are oriented so that valve member 124 is gravity biased in the open position, spaced apart from valve seat 126 as shown. Screen 128 keeps valve member 124 from falling out of first fluid passage 120.

Figure 1B:
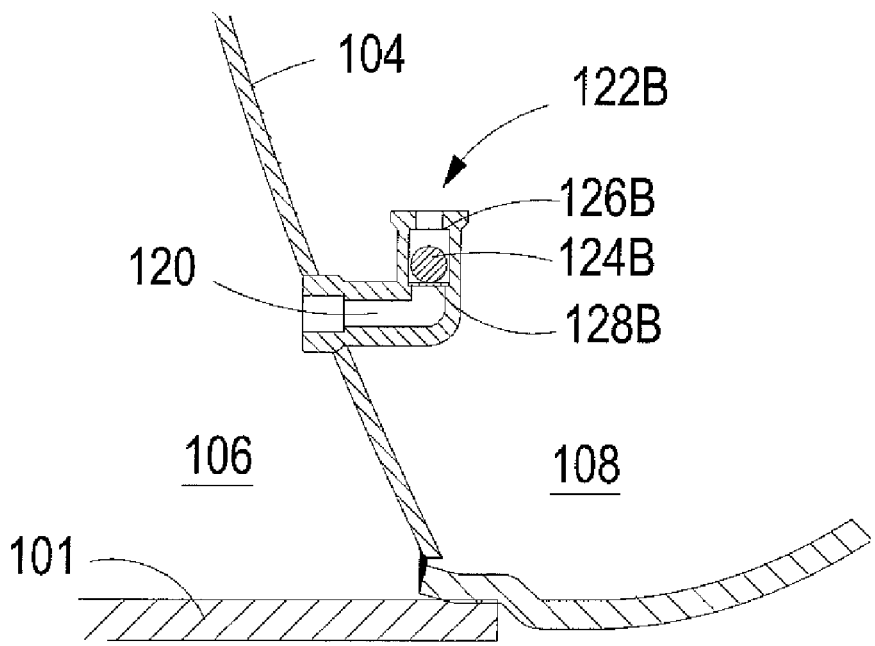

In FIG. 1B, first fluid passage 120 is in the shape of an upturned 90-degree elbow with the upturned open end being in auxiliary space 108. Valve 122B is associated with the vertically aligned portion of the elbow so that valve member 124B is urged by gravity to the open position away from valve seat 126B. Screen 128B keeps valve member 124B from resting against the walls of first fluid passage 120 where it might otherwise restrict flow there through when valve member 124B is spaced apart from valve seat 126B.

The embodiments of FIGS. 1A and 1B can be paired with an open but constricted second fluid passage such as second fluid passage 130 shown in FIG. 1 or with second fluid passage 130C shown in FIG. 1C, or with a second fluid passage that further comprises a valve such as the embodiments shown in FIGS. 1E through 1G, which are described below. In FIG. 1, second fluid passage 130 is simply an orifice provided in partition 104. The orifice can be made by simply drilling a hole in partition 104 or by installing an orifice plate.

Figure 1C:
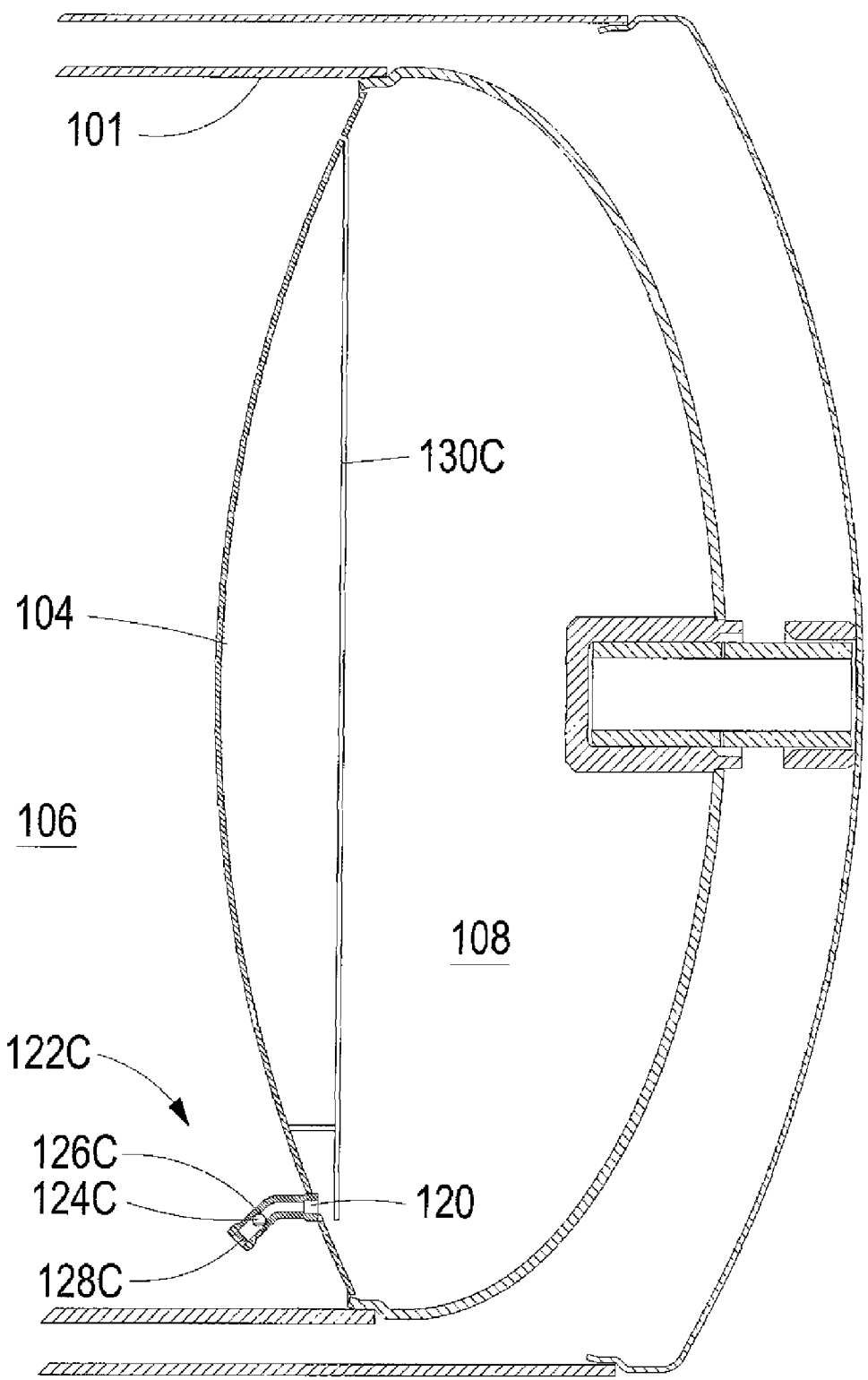

With reference to FIG. 1C, first fluid passage 120 is also elbow-shaped, but down-turned into main storage space 106 at less than 90 degrees from the horizontal axis, with valve 122C located on the downward sloping portion so that gravity still urges valve member 124C to the open position away from valve seat 126C. This example shows that to gravity bias the valve member it need not be vertically oriented and, in fact, any slope can be employed, with shallower slopes employed if it is desired to reduce the gravity bias and make the valve close under the influence of a smaller fluid pressure differential. Screen 128C allows fluid to pass through the open end while retaining valve member 124C within first fluid passage 120.

FIG. 1C also shows another embodiment of the second fluid passage labeled with reference number 130C. Second fluid passage 130C comprises a conduit that has an open end into the upper region of main storage space 106 and an open end into the lower region of auxiliary space 108. The advantage of this configuration is that when liquefied gas is being drained from auxiliary space 108, the liquefied gas can be drained through both the first and second fluid passages and liquefied gas that fills second fluid passage 130C prevents vapor from flowing through it, helping to maintain a differential vapor pressure. While the embodiment of FIG. 1 has the advantage of being simpler, it allows more vapor to escape from auxiliary space 108 while main storage space 106 is being vented and this reduces the vapor pressure differential that helps to drain liquefied gas from auxiliary space 108. Even so, the restricted flow area of second fluid passage 130 in FIG. 1 does allow a pressure differential to develop and be sustained to serve the desired purpose of draining liquefied gas from auxiliary space 108.

Figure 1D:
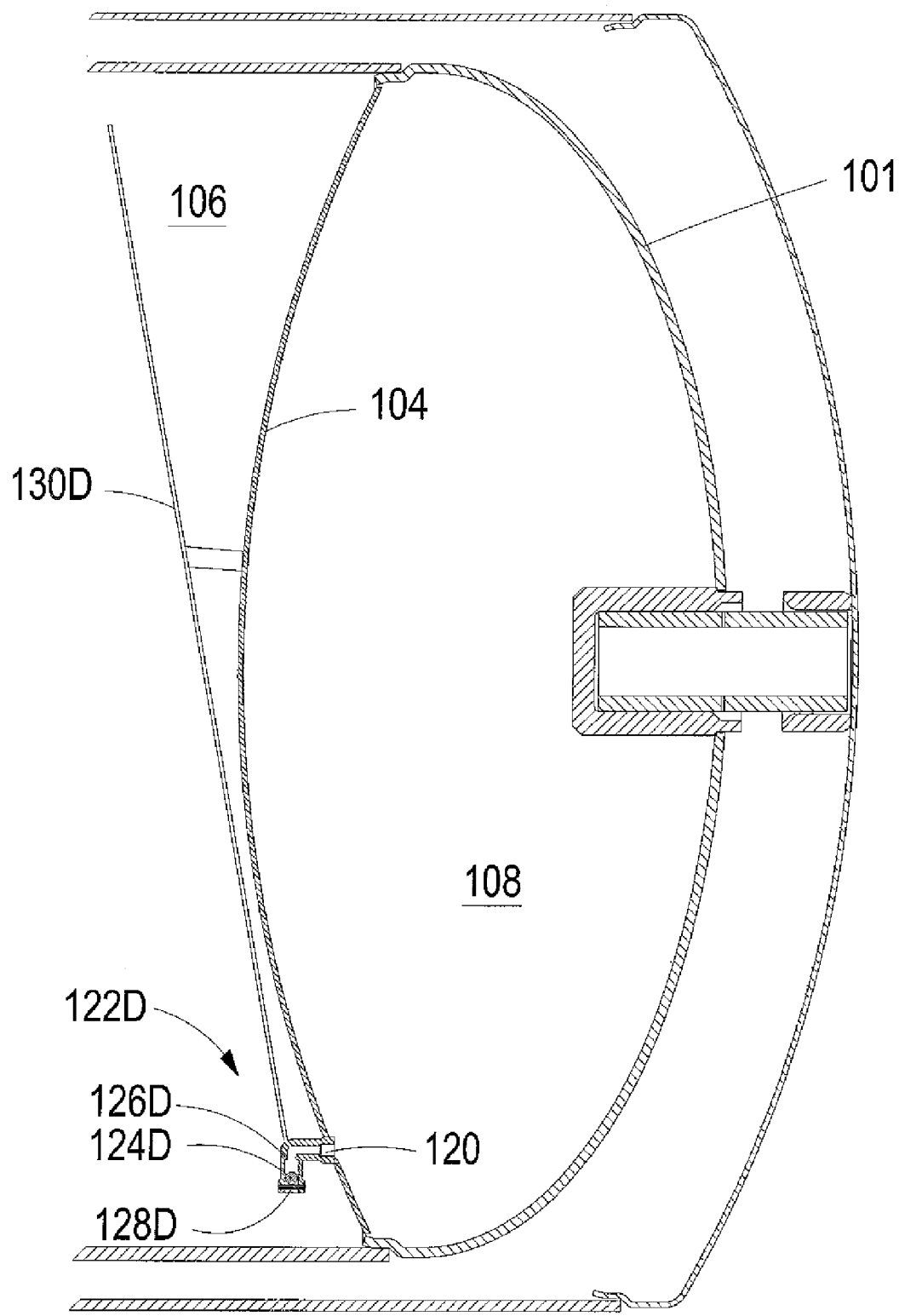
Figure 1E:
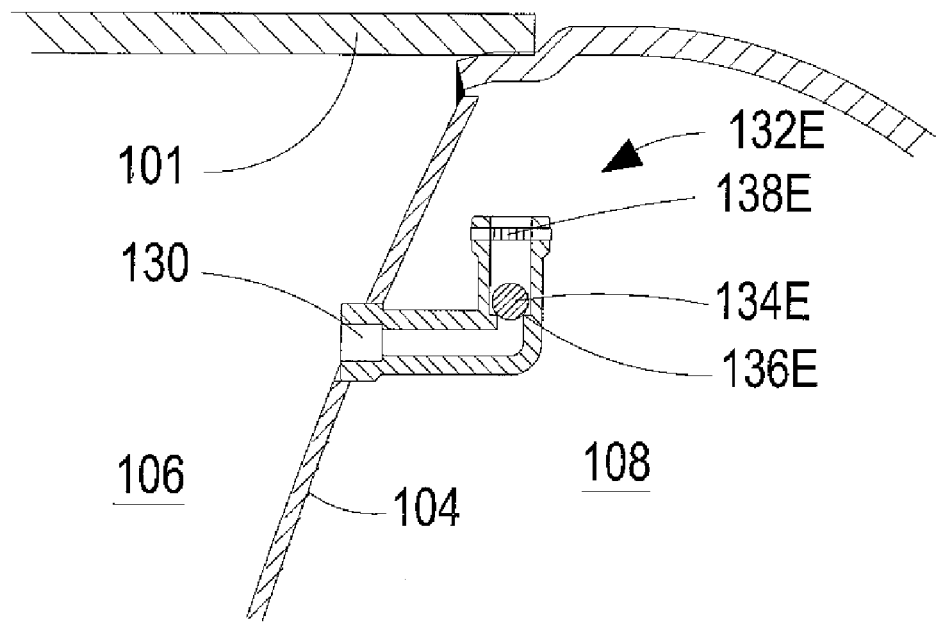
Figure 1F:
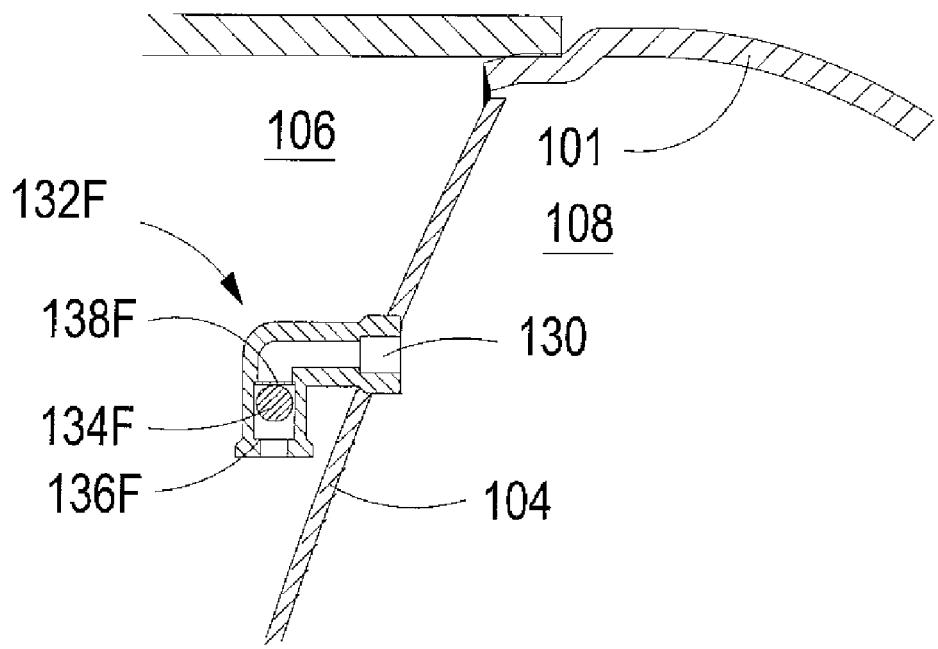
Figure 1G:
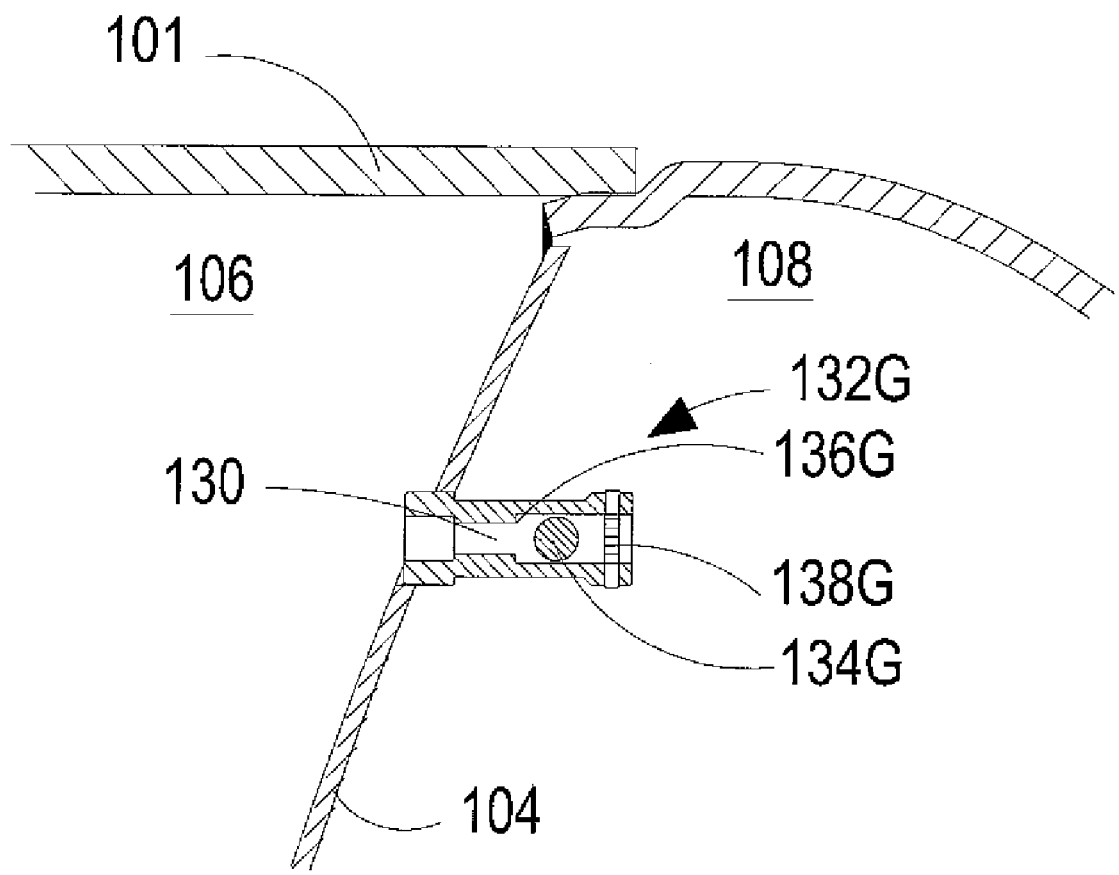

With reference to FIG. 1D, first fluid passage 120 is in the shape of a down-turned 90-degree elbow with the open down-turned open end being in main storage space 106. Valve 122D is associated with a vertically aligned portion of the elbow so that valve member 124D is urged by gravity to the open position away from valve seat 126D. Second fluid passage 130D is similar to the second fluid passage of FIG. 1C because it comprises a conduit that extends from an open end associated with the upper region of main storage space 106 to an opening associated with the lower region of auxiliary space 108. However, in this embodiment second fluid passage 130D is disposed in main storage space 106 and branches from first fluid passage 120 between valve 122D and the opening into auxiliary space 108. This configuration shows that the scope of the present design concept includes embodiments in which the first and second fluid passages share one opening through partition 104. The two fluid passages define two different routes through which cryogenic fluid can flow between main storage space 106 and auxiliary space 108. First fluid passage 120 allows two-way flow of cryogenic fluid between the lower region of main storage space 106 and the lower region of auxiliary space 108, while second fluid passage 130D provides a constricted flow path that allows cryogenic fluid to flow between the upper region of main storage space 106 and the lower region of auxiliary space 108. That is, in this arrangement, the two fluid passages between main storage space 106 and auxiliary space 108 share the same opening through partition 104, while still functioning as separate fluid passages in a manner similar to the fluid passage arrangement shown in FIG. 1C.

FIGS. 1E through 1G all show embodiments of second fluid passage 130 that further comprise a valve that controls fluid flow through this fluid passage. The valves shown in the embodiments of FIGS. 1E and 1G are both oriented so that respective valve members 134E and 134F are gravity biased in a closed position. The valves in these two arrangements operate in substantially the same manner. In FIG. 1E, valve 132E is disposed in the vertical part of an up-turned elbow that has its open end in auxiliary space 108. Valve member 134E is shown in the closed position, resting against valve seat 136E. Screen 138E prevents valve member 134E from being pushed out of second fluid passage 130. In FIG. 1F, valve 132F is disposed in the vertical part of a down-turned elbow that has its open end in main storage space 106. In this illustration, valve member 134F is shown in the open position, spaced apart from valve seat 136F. Screen 138F allows cryogenic fluid to flow through valve 132F by preventing valve member 134F from sealing against the walls of second fluid passage 130. With reference to FIGS. 1E and 1F, respective valve members 134E and 134F are lifted into the open position from the closed position when fluid pressure in main storage space 106 is higher than fluid pressure in auxiliary space 108. That is, as in the other embodiments, vapor at a higher pressure in main storage space 106 can flow through second fluid passage 130 into auxiliary space 108 thereby moderating the effect of fluid pressure increases caused, for example, by heat leak and volumetric expansion of the liquefied gas. In these embodiments, valves 132E and 132F are gravity biased in the closed position so that when fluid pressure in auxiliary space 108 is higher than fluid pressure in main storage space 106, the valve will remain closed and the fluid pressure differential can help to push liquefied gas into main storage space 106 from auxiliary space 108 through first fluid passage 120.

FIG. 1G shows yet another embodiment of second fluid passage 130 that comprises a valve. This embodiment shows that valve 132G, which is associated with second fluid passage 130, need not be gravity biased. In this embodiment, when the storage tank is level, valve member 134G can move to an open position spaced apart from valve seat 136G when vapor pressure in main storage space 106 is higher than the vapor pressure in auxiliary space 108 because it does not need to overcome a gravity bias. Even when the storage tank is not level, the forces of gravity will be much less than it would be in the embodiments shown in FIGS. 1E and 1F. Second fluid passage 130, like the other embodiments, including those shown in FIGS. 1E and 1F, still provides a constricted flow area, so that when main storage space 106 is being filled with cryogenic fluid there will be a rise in back-pressure when main storage space is filled, even when valve member 134G is urged to an open position against screen 138G. Like the embodiments of FIGS. 1E and 1F, when vapor pressure is higher in auxiliary space 108 compared to the vapor pressure in main storage space 106, valve member 134G will be pushed against valve seat 136G so that a high pressure differential can be maintained to help push liquefied gas from auxiliary space 108 to main storage space 106 when main storage space 106 is being vented or filled.

For the valves associated with the fluid passages through the partition that are shown in the Figures, the following equations summarize their operation, where:

$P_m$ is the sum of the fluid pressure forces acting on the valve member from the main storage space side, including the vapor pressure and static liquefied gas pressure;

$P_a$ is the sum of the fluid pressure forces acting on the valve member from the auxiliary space side, including the vapor pressure and static liquefied gas pressure;

$P_g$ is the force of gravity acting on the valve member;

$M_{ma}$ is the fluid momentum force acting on the valve member caused by fluid moving through the valve from the auxiliary space to the main storage space; and $M_{am}$ is the fluid momentum force acting on the valve member caused by fluid moving through the valve from the auxiliary space to the main storage space.

For a valve that is gravity biased in an open position, such as valves 122, 122B, 122C, and 122D in respective FIGS. 1, 1A, 1B, 1C and 1D, the valve member is urged to and remains in an open position, spaced apart from the valve seat when $P_m < P_a + P_g + M_{am}$. If the valve member is initially seated against the valve seat as shown in FIG. 1C, $M_{am}$ is zero or substantially zero even if the valve member allows some leakage between itself and the valve seat. Once the valve member is spaced from the valve seat and cryogenic fluid is flowing through first fluid passage 120 from auxiliary space 108 to main storage space 106, $M_{am}$ can increase to a more significant value, adding to the forces that urged the valve member to the open position. The valve member is urged back to the seated position when $P_m + M_{ma} > P_a + P_g$. This can occur, for example, when main storage space 106 is being filled, the vapor pressure differential across partition 104 is reduced, and the increasing level of liquefied gas in main storage space 106 causes fluid flow in first fluid passage 120 to reverse direction, whereby $M_{ma}$ adds to the fluid forces urging the valve member towards the valve seat. When the valve member is pressed against the valve seat, $M_{ma}$ is zero (or substantially zero if only a small amount of leakage occurs through the valve). It is worthwhile noting that in preferred embodiments, a perfectly fluid tight seal when the valve member is in the seated position is not essential. For example, the valve associated with first fluid passage 120 will still function to achieve the intended result even if the valve allows a small amount of leakage between the valve member and the valve seat, as long as the leakage is small enough to preserve the desired volume of vapor space during filling. That is, even a partially seated valve member or a valve member that is imperfectly sealed against the valve seat will still provide a constriction in the fluid passage preventing a significant amount of fluid from flowing through the fluid passage. Because the disclosed apparatus is tolerant of some leakage through the valves, a low degree of precision is acceptable for manufacturing specifications, which means that the cost of manufacturing the valve can be kept low. A small amount of leakage can actually help to equalize vapor pressure and the level of liquefied gas in cryogen space 102, 402 after the re-filling process, during normal operation when holding and dispensing cryogenic fluid. Being tolerant of some leakage also makes the design robust, meaning that it will still operate acceptably even if the fluid seal is not perfect, which is important for an apparatus that comprises components that are disposed inside the cryogen space where they are difficult, if not entirely impractical, to access for repair.

For a valve that has a valve member that is gravity biased in a seated position, such as valves 132E and 132F in respective FIGS. 1E and 1F, the valve member is urged to and remains in a seated position, pressed against the valve seat when $P_m + M_{ma} < P_a + P_g$. If the valve member is initially seated against the valve seat, $M_{ma}$ is zero or substantially zero. Once the valve member is urged to a position where it is spaced apart from the valve seat and fluid is flowing from main storage space 106 to auxiliary space 108 through second fluid passage 130, $M_{ma}$ increases to a significant value, adding to the forces acting on the valve member to keep it in an open position. With valve members 134E and 134F biased by gravity in seated positions the respective valves act effectively like one-way valves since higher fluid pressures in auxiliary space 108 and fluid momentum forces associated with fluid flow through second fluid passage 130 from auxiliary space 108 to main storage space 106 would both act on valve members 134E and 134F to urge them to their respective seated positions.

As already mentioned in the description of these embodiments, when main storage space 106 is being vented, it is desirable for a higher vapor pressure to develop in auxiliary space 108 so that liquefied gas will flow from auxiliary space 108 into main storage space 106 though first fluid passage 120. Accordingly, if valves 132E and 132F remain closed during the venting of main storage space 106, this helps to maintain a vapor pressure differential that promotes this objective.

Valves 132E and 132F open when $P_m + M_{ma} > P_a + P_g$ and this occurs when vapor pressure within main storage space 106 is higher than fluid pressure and gravitational forces acting on valve members 134E and 134F, respectively, allowing vapor in main storage space 106 to flow into auxiliary space 108 through second fluid passage 130.

In the disclosed embodiments, the valve(s) that are associated with the fluid passages through the partition and disposed inside cryogen space 102 operate to regulate flow between main storage space 106 and auxiliary space 108 and are actuated primarily by fluid forces. In some embodiments, additional forces such as gravitational forces can also be applied to help bias the valve member in an open or closed position. It is recognized that other biasing forces can be also be employed to the valve member, such as spring forces or buoyancy forces. While the illustrated embodiments show a spherical valve member, persons familiar with the technology involved here will understand that the valve mechanism can be of a different type, such as, for example, a hinged valve member. The type of valve is not important as long as it can be made with the requisite robustness, durability, and expected service life, because it is difficult if not entirely impractical to repair a valve that is disposed within the cryogen space. If consistent with this requirement, in other embodiments (not shown) the valve member can use a spring to bias it to an open or seated position. For example, referring now to valve 132G shown in FIG. 1G, this valve could further include a spring disposed between valve member 134G and the open end in auxiliary space 108, whereby the spring would bias valve member 134G against valve seat 136G. In this example, the spring force could be added to the equation for describing its operation. There could also be embodiments that employ a different combination of forces acting on the valve member in addition to the fluid forces, and for such embodiments, persons familiar with the technology involved here would understand how to revise the equations described herein to account for the additional forces acting on the valve member.

In the following paragraphs, different operational scenarios will be described to further elaborate on the preferred embodiments.

Venting prior to re-filling. There can be significant variability in the vapor pressure inside storage tanks that are brought to a filling station for re-filling. Some of the many different variables that can influence vapor pressure include ambient temperature, how long the cryogenic fluid has been held in the storage tank, and the initial vapor pressure after the last re-fill. It is common practice to vent a cryogenic storage tank prior to re-filling, to reduce the vapor pressure within the cryogen space. Depending on the filling station's delivery pressure, vapor pressure in the cryogen space can slow the delivery of cryogenic fluid into the storage tank. A problem with prior art designs that have a vertical partition and an orifice restricting flow through the partition is that over time the level of liquefied gas inside the cryogen space can equalize in the two spaces separated by the partition. Consequently, when a partially emptied storage tank is brought to a filling station, there can be liquefied gas in the auxiliary space. With prior art storage tanks, during venting and re-filling, the liquefied gas in the auxiliary space can not drain quickly enough into the main storage space through the orifice, so after the main storage space is filled, the reserved vapor space is smaller than desired because liquefied gas still occupies some of the auxiliary space. With reference to the storage tank of FIG. 1 as an example, the present design solves this problem. During the venting process, vapor vents from main storage space 106 faster than it can vent from auxiliary space 108 because of the constricted flow area through second fluid passage 130. This causes a pressure differential to develop between auxiliary space 108 and main storage space 106, with the higher pressure in auxiliary space 108 pushing liquefied gas from the bottom of auxiliary space 108 through first fluid passage 120 and open valve 122. First fluid passage 120 has a larger cross sectional area compared to second fluid passage 130 so that the liquefied gas can be drained quickly from auxiliary space 108. As liquefied gas is removed from auxiliary space 108 and as some vapor is vented through second fluid passage 130, the pressure differential between auxiliary space 108 and main storage space 106 gradually declines, until fluid pressures equalize and cryogenic fluid ceases to flow from auxiliary space 108 to main storage space 106.

With the understanding that storage tanks can be brought for re-filling in different states, some with higher vapor pressures, some with higher levels of residual liquefied gas, and so on, FIG. 2A is a plot that shows by way of one example, how a preferred embodiment of the disclosed storage tank operates to drain liquefied gas from the auxiliary space while the main storage space is being vented. This illustrative example is representative of how the disclosed storage tank can operate under different conditions. FIG. 2A is a plot of vapor pressure (with the scale on the left hand axis) against time in seconds overlaid with the level of liquefied gas inside a storage tank expressed as a percentage from full (with this scale on the right hand axis) plotted against the same time scale. In this example, the plotted data is calculated based upon the liquefied gas being methane and a storage tank that is generally cylindrical in shape with a horizontal longitudinal axis, like the storage tank shown in FIG. 1 and the fluid passages through the partition as shown in FIG. 1D, with the following characteristics: a cryogen space with a volumetric capacity of about 75 U.S. gallons (about 0.28 cubic meters); a fill conduit 110, which can also be used to vent cryogen space 102, with an internal diameter of about ¾ inch (about 19 mm); a first fluid passage with an internal diameter that is about 0.3 inch (about 7.6 mm); and, a second fluid passage that is a tube with an internal diameter that is about 3/16-inch (about 4.75 mm). In this example, before beginning to vent cryogen space 102 through fill conduit 110, the level of liquefied gas on both sides of the partition is equalized, initially at 50% (half empty), and the initial vapor pressure in the cryogen space is also equalized, at 170 pounds per square inch (psi; about 1.2 MPa). Line 210 is the plot of the vapor pressure within the main storage space and dashed line 212 is the plot of the vapor pressure within the auxiliary space, both plotted against time. The venting of cryogen space 102 begins at 0 seconds on the time scale. Line 214 is the plot of the level of liquefied gas within the main storage space and dashed line 216 is the plot of the level of the liquefied gas within the auxiliary space, both plotted against the same time scale as the vapor pressure data. FIG. 2A shows, surprisingly, that only a small pressure differential between the auxiliary space and the main storage space is all that is needed to drain the liquefied gas from the auxiliary space in a short period of time, showing, in this example, the level of liquefied gas dropping from 50% to about 3% in less than 220 seconds, which is less time that it takes to drop the vapor pressure from 170 psi (about 1.2 MPa) to 120 psi (about 0.8 MPa). When vapor is vented from main storage space 106, vapor cannot be vented from auxiliary space 108 as quickly, causing a pressure differential to develop. Near the end of the venting process the vapor pressure on either side of the partition again equalizes as vapor pressure within auxiliary space 108 eventually catches up with the reduced vapor pressure within main storage space 106. Over the course of this venting procedure, in this example, a maximum pressure differential of about 0.7 psi (about 5 kPa) develops. Whereas prior art storage tanks restricted flow between the partitioned spaces, which can inhibit draining liquefied gas from the auxiliary space, the disclosed apparatus is effective in draining even high levels of liquefied gas from the auxiliary space because first fluid passage 120 is sized large enough so that it does not overly restrict the flow of liquefied gas from auxiliary space 108 to main storage space 106. Once the liquefied gas is drained from auxiliary space 108 and vapor pressures equalizes, valve 122 is operative to restrict significant amounts of liquefied gas from flowing back into auxiliary space 108 even after vapor pressures equalize.

Re-Filling. In a preferred method, to begin re-filling a storage tank with cryogenic fluid, cryogenic fluid from a filling station is introduced through fill conduit 110 into main storage space 106 after the vapor pressure within main storage space 106 has been reduced to below a predetermined pressure threshold. As described in the previous paragraph, in a preferred method liquefied gas is drained from the auxiliary space during the venting process, but in a worst-case scenario, there can still be liquefied gas in the auxiliary space when re-filling commences. For example, a storage tank brought for re-filling can initially have a low vapor pressure whereby venting is not necessary, but equalized levels of liquefied gas within the cryogen space mean that there can be a significant amount of liquefied gas within the auxiliary space when re-filling commences. Even with such scenarios, the presently disclosed storage tank is operative to drain cryogenic fluid from auxiliary space 108 to main storage space 106, during re-filling as long as the vapor pressure within auxiliary space 108 is higher than vapor pressure within main storage space 106. The vapor pressure within main storage tank 106 can decline during filling because the new cryogenic fluid being introduced through fill conduit 110 further cools and condenses the vapor within main storage space 106. A pressure differential can develop because unlike the vapor within main storage space 106, partition 104 prevents the vapor within auxiliary space 108 from coming into direct contact with the cryogenic fluid being introduced through fill conduit 110. FIG. 2B is a plot that shows by way of one example, how the disclosed storage tank is operative to drain liquefied gas from auxiliary space 108 while main storage space 106 is being re-filled with cryogenic fluid. Like FIG. 2A, the illustrative example of FIG. 2B is representative of how the disclosed storage tank can operate under different conditions. FIG. 2B plots the same parameters as FIG. 2A and assumes a storage tank with the same characteristics, with the difference being the starting conditions and the time span corresponding to when the storage tank is being re-filled with cryogenic fluid rather than when it is being vented. In this example, the fill station has a delivery pressure of 50 psi (about 0.3 MPa). At 0 seconds on the time scale, the vapor pressure is 120 psi (about 0.8 MPa) inside both main storage space 106 and auxiliary space 108 and the level of liquefied gas on both sides of the partition is equalized, again initially at 50% (half empty). Line 220 is the plot of the vapor pressure within the main storage space and dashed line 222 is the plot of the vapor pressure within the auxiliary space, both plotted against time. The re-filling of cryogen space 102 begins at 0 seconds on the time scale. Line 224 is the plot of the level of liquefied gas within the main storage space and dashed line 226 is the plot of the level of the liquefied gas within the auxiliary space, both plotted against the same time scale as the vapor pressure data. Once again, with the disclosed apparatus, FIG. 2B shows, again surprisingly, that only a small pressure differential between the auxiliary space and the main storage space is all that is needed to drain the liquefied gas from the auxiliary space in a short period of time, showing, in this example, the level of liquefied gas dropping from 50% to about 15% in less than 100 seconds, which is about the same time that it takes to re-fill main storage space 106 with cryogenic fluid. Near the end of the re-filling process the rate at which vapor pressure declines in main storage space 106 also declines (as shown by the shallower slope of line 220 on the right hand side of FIG. 2B). After the introduction of cryogenic fluid is stopped, the vapor pressure on either side of partition 104 equalizes when vapor pressure within auxiliary space 108 eventually catches up with the reduced vapor pressure within main storage space 106. In this example, over the course of the re-filling procedure, a maximum pressure differential of about 3.3 psi (about 23 kPa) develops, which is even higher than the pressure differential that developed in the venting procedure example. The applicant found that with prior art storage tanks, even pressure differentials of this order of magnitude were not sufficient under some conditions to drain the liquefied gas from the auxiliary space to the desired level because the size of orifice employed by prior art designs restricted flow between the partitioned spaces.

The examples illustrated by FIGS. 2A and 2B, both show that the disclosed apparatus is effective in draining even high levels of liquefied gas from the auxiliary space because first fluid passage 120 is sized large enough so that it does not overly restrict the flow of liquefied gas from auxiliary space 108 to main storage space 106. With the disclosed storage tank, if vapor pressure equalizes or the fluid pressure differential reverses with the rising static fluid pressure in main storage space 106 and the declining vapor pressure in auxiliary space 108, flow of liquefied gas from auxiliary space 108 can eventually stop. Once fluid pressure within main storage space 106 is higher than fluid pressure within auxiliary space 108, then valve 122 closes and fluid flow through first fluid passage 120 is blocked. In this example, valve 122 closes when fluid flow through first fluid passage 120 in the direction from main storage space 106 to auxiliary space 108 exceeds about 0.3 ounces/second (about 9 grams/second). Accordingly, cryogenic fluid does not flow back into auxiliary space 108 through first fluid passage 120 in significant amount because valve 122 is operative under the influence of fluid forces to restrict cryogenic fluid from flowing from main storage space 106 to auxiliary space 108.

The venting and re-filling scenarios described in the previous paragraphs demonstrate how the disclosed storage tank can operate during the venting or re-filling procedure to reserve a low-pressure vapor space from which liquefied gas has been evacuated, thereby preserving a space that can act as an ullage space into which cryogenic fluid can later expand. Because second fluid passage 130 is located near the top of partition 104, during re-filling, liquefied gas does not have an opportunity to flow through it until main storage space 106 is almost full. Even then, because second fluid passage has a constricted flow area, the amount of liquefied gas that does flow through it into auxiliary space 108 is negligible. The constricted flow area of first and second fluid passages 120, 130, especially when valve 122 is closed, cause a sudden increase in back-pressure when main storage space 106 is being re-filled and main storage space 106 is filled with liquefied gas. This sudden increase in back-pressure can be detected by the filling station so that it automatically stops delivering cryogenic fluid to prevent over-filling.

Holding and dispensing cryogenic fluid during normal operation. After main storage space 106 has been filled with liquefied gas, if heat leaks into cryogen space 102 and causes liquefied gas to be warmed and expanded, the compressed vapor can flow into auxiliary space 108 through second fluid passage 130, preventing a sudden increase in vapor pressure that would otherwise occur if there were no space into which the vapor could flow. Because second fluid passage 130 allows vapor to move freely through partition 104, and because partition 104 is thermally conductive, over time, pressure and temperature will equalize within cryogen space 102. Since valve 122 is gravity biased open, if the fluid pressure on the opposite ends of first fluid passage 120 are the same, liquefied gas can seep from main storage space 106 to auxiliary space 108 through valve 122 as long as the fluid momentum forces associated with such flow are less than the gravity force that urges valve member 124 to an open position. Over time, the level of liquefied gas in main storage space 106 will be substantially the same as the level of liquefied gas in auxiliary space 108 but this will not inhibit operation of the storage tank because the objective of preserving a desired volume of vapor space has already been achieved, and once the storage tank is re-filled, the location of the vapor space within cryogen space 102 is irrelevant. That is, as long as the desired volume of vapor space is preserved, it does not matter if the vapor occupies the upper region of cryogen space 102 on both sides of partition 104. First fluid passage 120 and valve 122 are sized so that liquefied gas can flow there through at a rate that is high enough to allow the level of liquefied gas on opposite sides of partition 104 to stay substantially equal even when cryogenic fluid is being dispensed at the designed maximum flow rate, and to allow liquefied gas within auxiliary space 108 to be evacuated there from when main storage space 106 is being vented prior to re-filling. This is an improvement over prior art tanks that employed a single opening in the partition to serve two functions which have opposite requirements. That is, a single fluid passage should to be small enough to restrict flow into the auxiliary space during re-filling, but this is disadvantageous when one is trying to empty liquefied gas from the auxiliary space when the storage tank is being vented or re-filled, or when liquefied gas is being dispensed at the maximum rate. By having two fluid passages, one is sized with a constriction to restrict flow of liquefied gas during re-filling while being large enough to allow vapor expansion and equalization during normal operation, and the other fluid passage, is equipped with a valve to prevent a significant amount of liquefied gas from flowing into the auxiliary space during re-filling, while being sized large enough to allow higher flow rates from the auxiliary space to the main storage space when the storage tank is being vented or re-filled, or when cryogenic fluid is being dispensed at a high rate.

The embodiment of FIG. 3, is like the embodiment of FIG. 1 with like features bearing like reference numbers. The main difference is that storage tank 300 comprises pump 350, which is disposed with a suction inlet within main storage space 106 to remove cryogenic fluid there from and deliver it to delivery conduit 352. Persons familiar with the technology involved here will understand that the first and/or second fluid passages shown in FIG. 3 could be replaced with one of the respective first or second fluid passages shown in FIGS. 1B through 1G.

FIG. 4 illustrates a schematic view of storage tank 400 wherein partition 404 is more horizontally oriented to divide cryogen space 402 into main storage space 406 and auxiliary space 408. While it can be more difficult and more expensive to manufacture a partition with a horizontal orientation, this embodiment has some functional advantages for draining liquefied gas from auxiliary space 408. Further, this embodiment shows that other configurations are contemplated within the scope of the claimed design. Different orientations for the partition can be used. Like the other embodiments, cryogenic fluid can be introduced into cryogen space 402 through fill conduit 110, which has outlet 111 that opens into main storage space 406. First fluid passage 420 is disposed with an opening at a low point of auxiliary space 408 to facilitate the gravity assisted flow of liquefied gas from auxiliary space 408 into main storage 406. Valve 422 comprises valve member 424 which can be gravity biased in an open position. Valve member 424 can be made to be buoyant in the liquefied gas so that buoyancy forces can also act on valve member 424 in addition to fluid momentum forces to urge it towards valve seat 426 when the level of liquefied gas in main storage space 406 is high enough. Screen 428 permits cryogenic fluid to enter and exit from first fluid passage 420, while preventing valve member 424 from falling out. Because auxiliary space 408 is in the upper region of cryogen space 402, unlike embodiments with a vertically oriented partition, liquefied gas need not enter auxiliary space to maintain the liquefied gas at a substantially constant level across the bottom of cryogen space 402. Accordingly, valve 422 can be a one-way valve that allows cryogenic fluid to flow through first fluid passage only from auxiliary space 408 to main storage space 406. Second fluid passage 430 comprises an orifice connecting an upper region of main storage space 406 with an upper region of auxiliary space 408. The orifice is sized to constrict the flow of liquefied gas from main storage space 406 to auxiliary space 408. During filling, size and location of the orifice reduces the flow of liquefied gas from main storage space 406 to an insignificant amount since such flow is limited to the time when the level of the liquefied gas in main storage space 406 has risen to the level of the orifice, near the end of the filling process. Second fluid passage 430 helps to equalize vapor pressure throughout cryogen space 402 and to prevent valve member 424 from being stuck in the closed position if valve member 424 makes a fluid tight seal against associated valve seat 426. Like other embodiments, first fluid passage 420 can be sized to accommodate higher flow rates from auxiliary space 408 to main storage space 406 because valve 422 prevents liquefied gas from flowing in the reverse direction during filling. During normal operation when storage tank 400 is holding and dispensing liquefied gas, second fluid passage 430 permits vapor to flow from main storage space 406 into auxiliary space 408 to slow vapor pressure increases caused by heat leak and expansion of the liquefied gas within cryogen space 402. When storage tank 400 is brought to a filling station to be re-filled, with the configuration of this embodiment, the level of liquefied gas in main space 406 will normally be below the low point of auxiliary space 408, so all of the liquefied gas that may have been held in auxiliary space 408 will be drained already into main storage space 406 through valve 422. Since there will not typically be liquefied gas in auxiliary space 408, one difference is that it will not be important to establish a pressure differential like in the other embodiments to push liquefied gas from the auxiliary space to the main storage space. With storage tank 400, during venting, prior to filling, the larger flow capacity of first fluid passage 420 together with open second fluid passage 430 will both permit vapor to be vented from auxiliary space 408 more quickly than prior art designs, which restrict fluid flow, and this is advantageous because it is desirable for the vapor pressure to be reduced to a lower pressure, to increase the capacity of the ullage space to accept more vapor and expanded liquefied gas before there is a need to vent vapor through the pressure relief valve. If the fill station's delivery pressure happens to be higher than the vapor pressure in auxiliary space 408, if the pressure differential is high enough to cause valve member 424 to move towards valve seat 426, this can preserve the lower vapor pressure in auxiliary space 408 during re-filling.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A cryogenic storage tank comprises:
   (a) a cryogen space defined by a thermally insulated vessel for storing a cryogenic fluid;
   (b) a partition dividing said cryogen space into a main storage space and an auxiliary space;
   (c) a conduit connecting said main storage space with a coupling outside said storage tank;
   (d) a first valve disposed inside said cryogen space and associated with a first fluid passage through said partition, said first fluid passage being in fluid communication with a lower region of said auxiliary space and said first valve comprising a first valve member that is actuatable by fluid forces within said cryogen space to move from an open position to a seated position when said fluid forces within said main storage space are higher than fluid forces within said auxiliary space by a predetermined amount;
   (e) a second fluid passage through said partition, wherein said second fluid passage comprises a restricted flow area that is dimensioned to have a cross-sectional flow area that is smaller than that of said conduit such that there is a detectable increase in back-pressure in said conduit when said cryogenic fluid is being introduced into said main storage space and said main storage space is filled with liquefied gas; and
   (f) a second valve disposed in said second fluid passage, said second valve comprising a second valve member that is actuatable by fluid forces within said cryogen space to move between an open position and a seated position, wherein closing forces acting on said second valve member associated with said second valve urge said second valve member to said seated position when fluid pressure within said main storage space does not exceed fluid pressure within said auxiliary space by a predetermined amount.

2. The storage tank of claim 1 wherein said first valve member is movable from said open position to said seated position when fluid pressure within said main storage space is higher than fluid pressure within said auxiliary space by a predetermined amount.

3. The storage tank of claim 1 wherein said fluid forces comprise static liquefied gas pressure and vapor pressure, and when said first valve is open, dynamic fluid momentum forces are caused by said cryogenic fluid flowing through said first valve.

4. The storage tank of claim 1 wherein said first valve is oriented within said cryogen space so that gravitational forces add to said fluid forces that act on said first valve member, wherein said gravitational forces bias said first valve member towards said open position.

5. The storage tank of claim 4 wherein said first valve member is moveable along a vertical axis between said open and seated positions.

6. The storage tank of claim 4 wherein said first valve member is moveable along a sloped axis between said open and seated positions.

7. The storage tank of claim 1 wherein said first valve member is spherical.

8. The storage tank of claim 1 wherein said first valve member is made from materials selected from the group consisting of metallic materials and ceramic materials.

9. The storage tank of claim 1 wherein said first fluid passage and said first valve are sized to allow said cryogenic fluid to flow from said auxiliary space to said main storage space at a rate that keeps said liquefied gas at a level within said auxiliary space that is substantially the same as the level of said liquefied gas within said main storage space when said cryogenic fluid is being dispensed from said cryogen space.

10. The storage tank of claim 1 further comprising an outlet conduit extending from said main storage space to outside said thermally insulated vessel, wherein said first fluid passage and said first valve, when open, each respectively have a cross-sectional flow area that at its smallest section is at least as large as the cross-sectional flow area of said outlet conduit at its smallest section.

11. The storage tank of claim 1 wherein said first valve member is movable to said open position when vapor pressure within said auxiliary space is equal to vapor pressure within said main storage space.

12. The storage tank of claim 1 wherein said partition is oriented to extend between an upper region and a lower region of said cryogen space, thereby defining one side of said cryogen space as said auxiliary space.

13. The storage tank of claim 12 wherein said second fluid passage comprises a conduit with a first opening into said main storage space near said upper region of said cryogen space, a second opening into said auxiliary space near said lower region of said cryogen space.

14. The storage tank of claim 1 wherein said second fluid passage is a hole through said partition with said second fluid passage having a length that is defined by the thickness of said partition.

15. The storage tank of claim 1 wherein a plate with an orifice defines said restricted flow area in said second fluid passage.

16. The storage tank of claim 1 wherein said second valve member associated with said second valve is movable by differential fluid pressure, to move said second valve member to said open position to allow cryogenic fluid to flow from said main storage space to said auxiliary space when fluid pressure inside said main storage space is higher than fluid pressure inside said auxiliary space by a predetermined amount.

17. The storage tank of claim 1 wherein said second valve is oriented within said cryogen space so that said second valve member associated with said second valve is gravity biased in said seated position.

18. The storage tank of claim 1 wherein said second valve permits fluid flow through said second fluid passage only in a direction from said main storage space to said auxiliary space.

19. The storage tank of claim 1 wherein said second valve member associated with said second valve is spherical.

20. The storage tank of claim 1 wherein said second valve member associated with said second valve is made from materials selected from the group consisting of metallic materials and ceramic materials.

21. The storage tank of claim 1 wherein said auxiliary space is smaller than said main storage space.

22. The storage tank of claim 1 wherein said auxiliary space is less than 15% by volume of said cryogen space.

23. The storage tank of claim 1 wherein said auxiliary space is less than 10% by volume of said cryogen space.

24. The storage tank of claim 1 further comprising an outlet conduit extending from said main storage space to outside said thermally insulated vessel.

25. The storage tank of claim 1 further comprising a vent conduit that branches off from said fill conduit outside said thermally insulated vessel.

26. The storage tank of claim 1 further comprising a pump with an inlet disposed within said main storage space with an outlet conduit extending from said pump to outside said thermally insulated vessel.

* * * * *